(12) United States Patent
Noth

(10) Patent No.: US 11,414,263 B2
(45) Date of Patent: Aug. 16, 2022

(54) CONTAINER, PREPARATION MACHINE AND SYSTEM USING A BINARY CODE FOR ENCODING PREPARATION INFORMATION

(71) Applicant: SOCIETE DES PRODUITS NESTLE S.A., Vevey (CH)

(72) Inventor: Andre Noth, Pully (CH)

(73) Assignee: Societe des Produits Nestle S.A., Vevey (CH)

( * ) Notice: Subject to any disclaimer, the term of this patent is extended or adjusted under 35 U.S.C. 154(b) by 205 days.

(21) Appl. No.: 16/753,457

(22) PCT Filed: Oct. 1, 2018

(86) PCT No.: PCT/EP2018/076584
§ 371 (c)(1),
(2) Date: Apr. 3, 2020

(87) PCT Pub. No.: WO2019/068610
PCT Pub. Date: Apr. 11, 2019

(65) Prior Publication Data
US 2020/0317439 A1    Oct. 8, 2020

(30) Foreign Application Priority Data

Oct. 6, 2017  (EP) .................................. 17195166

(51) Int. Cl.
*G06K 19/06* (2006.01)
*B65D 85/804* (2006.01)
*A47J 31/44* (2006.01)

(52) U.S. Cl.
CPC ...... *B65D 85/8043* (2013.01); *A47J 31/4492* (2013.01); *B65D 85/8058* (2020.05);
(Continued)

(58) Field of Classification Search
CPC ............. B65D 85/8043; B65D 85/8058; A47J 31/4492; G06K 19/06037; G06K 19/06093
(Continued)

(56) References Cited

U.S. PATENT DOCUMENTS 10,387,702 B2 * 8/2019 Noth .................. B65D 85/8058
10,595,669 B2 * 3/2020 Noth .................. B65D 85/8058
10,810,391 B2 * 10/2020 Noth .................. A47J 31/4492

FOREIGN PATENT DOCUMENTS

EP    3031748    6/2016
RU    2556386 C2    7/2015
(Continued)

OTHER PUBLICATIONS

India Office Action for Application No. /202017005877 dated Mar. 29, 2022.
(Continued)

*Primary Examiner* — Daniel A Hess
(74) *Attorney, Agent, or Firm* — K&L Gates LLP

(57) ABSTRACT

Container for a beverage or foodstuff preparation machine, the container for containing beverage or foodstuff material and comprising a code encoding preparation information, the code comprising a reference portion (80) and a data portion (78). The reference portion (80) comprises three reference units (86) defining a reference line (81), the three reference units (86) being arranged at the vertices of an isosceles reference triangle having a reference apex angle. The data portion comprises discrete positions (75) at locations determined relative to the reference line (81), each discrete position either comprises or does not comprise a data unit (82) to at least partially encode the preparation information, wherein the discrete positions (75) are arranged at vertices of a grid of isomorphic tessellating isosceles data
(Continued)

triangles, the data triangles having a data apex angle different from the reference apex angle.

14 Claims, 13 Drawing Sheets

(52) U.S. Cl.
CPC . *G06K 19/06037* (2013.01); *G06K 19/06093* (2013.01); *B65D 2203/00* (2013.01)

(58) Field of Classification Search
USPC .......................................... 235/494; 426/115
See application file for complete search history.

(56) References Cited

FOREIGN PATENT DOCUMENTS

| | | |
|---|---|---|
| WO | 2014067987 A1 | 5/2014 |
| WO | 2016173737 | 11/2016 |
| WO | 2017144579 A1 | 8/2017 |

OTHER PUBLICATIONS

Russian Office Action for Patent Appl No. 2020112732 dated Apr. 20, 2022.

* cited by examiner

CONTAINER, PREPARATION MACHINE AND SYSTEM USING A BINARY CODE FOR ENCODING PREPARATION INFORMATION

CROSS REFERENCE TO RELATED APPLICATIONS

The present application is a National Stage of International Application No. PCT/EP2018/076584, filed on Oct. 1, 2018, which claims priority to European Patent Application No. 17195166.8, filed on Oct. 6, 2017, the entire contents of which are being incorporated herein by reference.

FIELD OF THE INVENTION

The present invention relates to a beverage and/or foodstuff preparation system for preparing beverages and/or foodstuffs from containers such as coffee capsules. The present invention relates in particular to codes arranged on the containers, which encode preparation information to be read by a machine of the system.

BACKGROUND ART

Increasingly, systems for the preparation of beverages or foodstuffs are configured to operate using containers that comprise single-servings of beverage or foodstuff material, e.g. coffee, tea, ice cream, yoghurt. A machine of such a system may be configured for preparation by processing said material in the container, e.g. with the addition of fluid, such as milk or water, and the application of mixing thereto. Such a machine is disclosed in WO 2014/067987. Alternatively, the machine may be configured for preparation by at least partially extracting an ingredient of the material from the container, e.g. by dissolution or brewing. Examples of such machines are provided in EP 2393404 A1, EP 2470053 A1, WO 2009/113035.

The increased popularity of these machines may be partly attributed to enhanced user convenience compared to a conventional preparation machine, e.g. compared to a manually operated stove-top espresso maker or cafetière (French press).

It may also be partly attributed to an enhanced preparation process, wherein preparation information specific to the container and/or material therein is: encoded in a code on the container; read by the machine; decoded; and used by the machine to optimise the preparation process. In particular, the preparation information may comprise operational parameters of the machine, such as, for example but not exclusively: fluid temperature; preparation duration; mixing conditions; fluid volume; and fluid pressure.

Accordingly, there is a need to code preparation information on the container. Various codes have been developed. An example is provided in EP 2594171 A1, wherein a periphery of a flange of a capsule comprises a code arranged thereon. The code comprises a sequence of symbols that can be printed on the capsule during manufacture. A drawback of such a code is that its encoding density is limited, i.e. the amount of preparation information that it can encode is limited. A further drawback is that the code is highly visible and may be considered aesthetically displeasing. EP2525691 A1 discloses a container with a 2D barcode, which has a higher albeit limited encoding density.

Thus in spite of the considerable effort already invested in the development of said systems further improvements are desirable.

Accordingly, an aim of the present invention is to provide a system and a container with a code allowing for a high density of preparation information.

Another aim of the present invention is to provide a system and a container with a code having a minimal visual impact on the container's appearance.

SUMMARY OF THE INVENTION

These aims and other advantages are achieved by a container for a beverage or foodstuff preparation machine, the container for containing beverage or foodstuff material and comprising a code encoding preparation information, the code comprising a reference portion and a data portion. The reference portion comprises three reference units defining a reference line, the three reference units being arranged at the vertices of an isosceles reference triangle having a reference apex angle. The data portion comprises discrete positions at locations determined relative to the reference line, each discrete position either comprises or does not comprise a data unit to at least partially encode the preparation information, wherein the discrete positions are arranged at vertices of a grid of isomorphic tessellating isosceles data triangles, the data triangles having a data apex angle different from the reference apex angle.

The three reference units are for example three distinct elements, for example three dots separated from each other, or at least partly integrated in another element of the reference configuration of the code, such as for example an image, wherein one or more of the reference units are easily recognizable parts of the image.

The data triangles are preferably congruent. Preferably, the data apex angle is neither a multiple nor a divisor of the reference apex angle. In embodiments, the reference apex angle is 90°, i.e. the reference triangle is a right-angled isosceles triangle, and the data apex angle is 60°, i.e. the data triangles are equilateral triangles.

The discrete positions are preferably arranged around the three reference units, for example on at least two concentric polygonal rows around the three reference units.

Preferably, the reference triangle, the data triangles and the reference line are virtual.

In embodiments, the code has a peripheral length of 600-1600 µm.

The code is for example formed on a surface of the container or on an attachment, which is attached thereto. In embodiments, the container comprises a plurality of codes arranged in a tessellating manner.

These aims and other advantages are also achieved by an attachment configured for attachment to a container for a beverage or foodstuff preparation machine, the container for containing beverage or foodstuff material, the attachment comprising an attachment member for attachment to said container and a carrier carrying a code comprising a reference portion and a data portion. The reference portion comprises three reference units defining a reference line, the three reference units being arranged at the vertices of an isosceles reference triangle having a reference apex angle. The data portion comprises discrete positions at locations determined relative to the reference line, each discrete position either comprises or does not comprise a data unit to at least partially encode the preparation information, wherein the discrete positions are arranged at vertices of a grid of isomorphic tessellating isosceles data triangles, the data triangles having a data apex angle different from the reference apex angle.

These aims and other advantages are also achieved by a beverage or foodstuff preparation system comprising a container of the invention and a beverage or foodstuff preparation machine, the preparation machine comprising a container processing subsystem to receive the container and to prepare a beverage or foodstuff therefrom; a code processing subsystem operable to: obtain a digital image of the code of the container; process the digital image to decode the encoded preparation information; a control subsystem operable to control the container processing subsystem using the decoded preparation information; wherein the code processing subsystem is configured to decode the encoded preparation information by: identifying the reference units of the code and determining therefrom a reference line; determining from the reference line the locations of the discrete positions; determining for each discrete position whether a data unit is arranged at the corresponding location or not; retrieving encoded preparation information from the result of the determining step.

These aims and other advantages are also achieved by an attachment configured for attachment to a beverage or foodstuff preparation machine, the beverage or foodstuff preparation machine comprising: a container processing subsystem to receive a container containing beverage or foodstuff material and to prepare a beverage or foodstuff therefrom; a code processing subsystem operable to: obtain a digital image of a code; process the digital image to decode preparation information encoded in the code; a control subsystem operable to control the container processing subsystem using the decoded preparation information; wherein the attachment comprises: an attachment member for attachment to the beverage or foodstuff preparation machine; a carrier carrying a code comprising a reference portion and a data portion. The reference portion comprises three reference units defining a reference line, the three reference units being arranged at the vertices of an isosceles reference triangle having a reference apex angle. The data portion comprises discrete positions at locations determined relative to the reference line, each discrete position either comprises or does not comprise a data unit to at least partially encode the preparation information, wherein the discrete positions are arranged at vertices of a grid of isomorphic tessellating isosceles data triangles, the data triangles having a data apex angle different from the reference apex angle.

These aims and other advantages are also achieved by a method of encoding preparation information, the method comprising forming a code on: a container for a beverage or foodstuff preparation machine, the container for containing beverage or foodstuff material; or an attachment for attachment to the container or a beverage or foodstuff preparation machine; the method further comprising: arranging three reference units at the vertices of an isosceles reference triangle having a reference apex angle, to define a reference line of a reference portion; at least partially encoding a parameter of the preparation information by arranging data units on at least one of discrete positions whose locations are determined relative to the reference line, whereby the discrete positions are arranged at vertices of a grid of isomorphic tessellating isosceles data triangles, the data triangles having a data apex angle different from the reference apex angle.

These aims and other advantages are also achieved by a method of preparing a beverage or foodstuff using a system according to the invention, the method comprising: placing said container in the container processing system; obtaining a digital image of the code of the container and processing the digital image to decode the encoded preparation information with the code processing subsystem; controlling the container processing subsystem with the control subsystem using a sequence of operations of the decoded preparation information; wherein the decoding of the encoded preparation information comprises: identifying the reference units of the code and determining therefrom a reference line; determining from the reference line the locations of the discrete positions; determining for each discrete position whether a data unit is arranged at the corresponding location or not; retrieving encoded preparation information from the result of the determining step.

These aims and other advantages are also achieved by the use of a code for preparing a foodstuff or beverage with a preparation system according to the invention using the preparation method of the invention.

These aims and other advantages are also achieved by a computer program executable on one or more processors of a code processing subsystem of a beverage preparation machine or foodstuff preparation machine, the computer program executable to process a digital image of a code of a container according to the invention to decode encoded preparation information, wherein the decoding preferably comprises: identifying the reference units of the code and determining therefrom a reference line; determining from the reference line the locations of the discrete positions; determining for each discrete position whether a data unit is arranged at the corresponding location or not; retrieving encoded preparation information from the result of the determining step; and by a non-transitory computer readable medium comprising such a computer program.

BRIEF DESCRIPTION OF FIGURES

The invention will be better understood thanks to the following detailed description of several embodiments with reference to the attached drawings, in which.

DETAILED DESCRIPTION OF THE INVENTION

Beverage/Foodstuff Preparation System

Figure 1A:
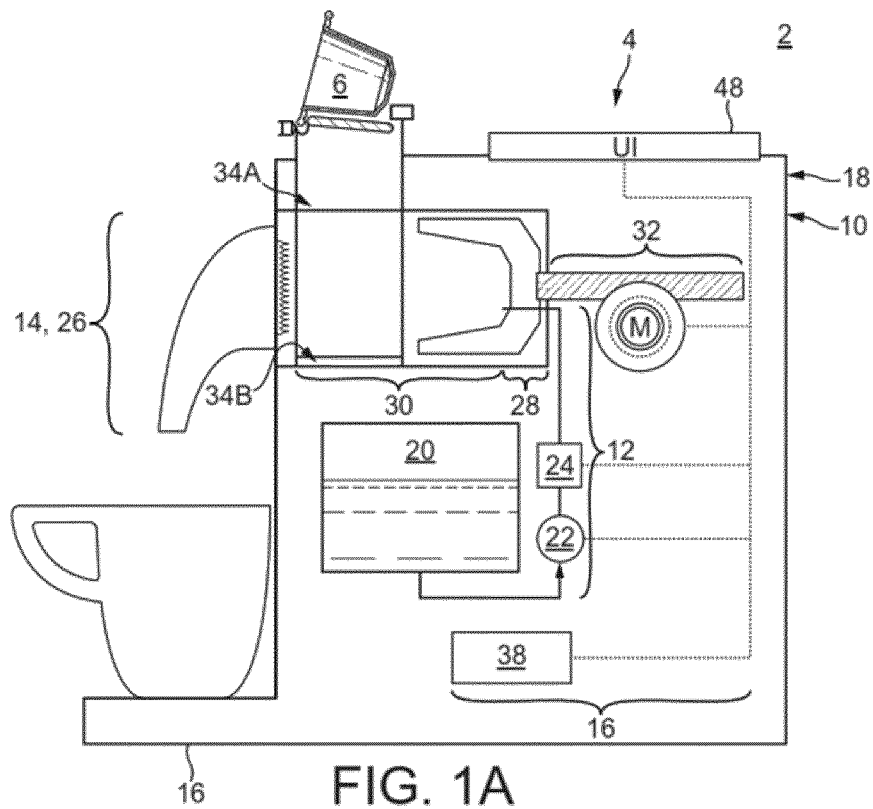
FIG. 1A shows an example of a beverage or foodstuff preparation system according to the invention.
Figure 1B:
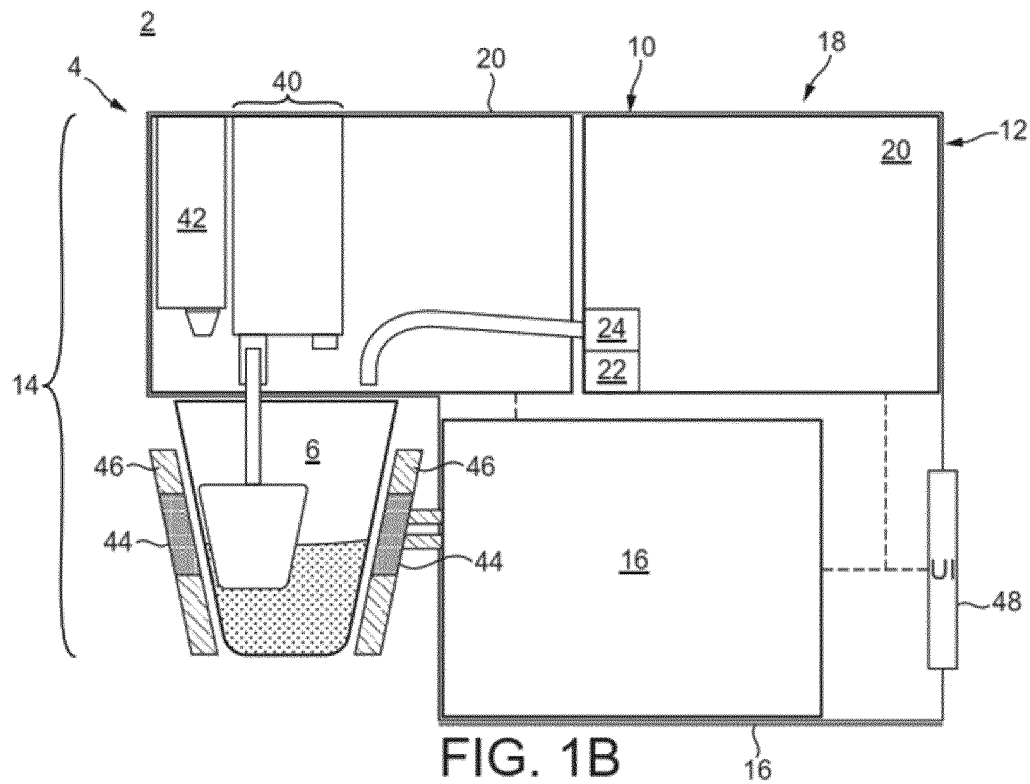
FIG. 1B shows another example of a beverage or foodstuff preparation system according to the invention.

A beverage or foodstuff preparation system 2, embodiments of which are illustrated in FIGS. 1A and 1B, comprises: a beverage or foodstuff preparation machine 4; a container 6, which are described further below.

Preparation Machine

The beverage or foodstuff preparation machine 4 is operable to process a beverage or foodstuff material (hereon material) arranged in the container 6 to a beverage and/or foodstuff for consumption by drinking and/or eating. Processing may comprise the addition of fluid, such as water or milk to said material. A foodstuff material as defined herein may comprise a substance capable of being processed to a nutriment generally for eating, which may be chilled or hot. The foodstuff is for example a liquid or a gel, non-exhaustive examples of which are: yoghurt; mousse; parfait; soup; ice cream; sorbet; custard; smoothies. The foodstuff may also be a cooked, baked and/or extruded foodstuff, non-exhaustive examples of which are pastries; bred; pizza; pasta; prepared dishes. A beverage material as defined herein may comprise a substance capable of being processed to a potable substance, which may be chilled or hot, non-exhaustive examples of which are: tea; coffee, including ground coffee; hot chocolate; milk; cordial. It will be appreciated that there is a degree of overlap between both definitions, i.e. in embodiments a said machine 4 can prepare both a foodstuff and a beverage.

The machine 4 is generally dimensioned for use on a work top and/or as a built-in kitchen appliance, i.e. it is preferably less than 80 cm in length, width and height.

The machine 4 comprises: a housing 10; a container processing subsystem 14; a control subsystem 16; and a code processing subsystem 18.

Housing

The housing 10 houses and supports the aforesaid machine components and preferably comprises: a base for abutment of a horizontally arranged support surface; a body for mounting thereto said components. In embodiments, the housing additionally or alternatively comprises elements for attaching and securing the machine into kitchen furniture as a built-in kitchen appliance.

Container Processing Subsystem

Depending on the particular embodiment the container processing subsystem 14 (which may also be considered a preparation unit) may be configured to prepare a foodstuff/beverage by processing material arranged in: one or more single-serving, single use container 6 that is a packet and/or capsule; a container 6 that is a receptacle for end-user consumption therefrom. In particular the material is processed to effect a change of its composition, e.g. by dissolution, extraction, mixing, extrusion, baking and/or cooking of an ingredient thereof. Embodiments of some configurations will be discussed.

Two or more such configurations may be combined in a single container processing subsystem in order for example to prepare a foodstuff/beverage from material contained in two or more containers requiring different processing. In embodiments, a container processing subsystem may for example be configured to simultaneously or sequentially: in a pressurised extraction unit, extract coffee from a capsule containing ground coffee and; in a dissolution unit, dilute powdered milk contained in a packet; in order to prepare a milk and coffee beverage such as for example a cappuccino, a cafe latte or a latte macchiato. In other embodiments, a container processing subsystem may for example be configured to simultaneously or sequentially: prepare at least part of a foodstuff/beverage in a receptacle for end user consumption in a mixing unit and; optionally dilute material contained in a container before dispensing it into the receptacle; in order for example to prepare a serving of ice-cream with topping or a flavoured milk-shake. Other feature combinations in a single container processing subsystem are possible within the frame of the invention in order to allow the preparation of foodstuff/beverages according to other complex recipes.

In embodiments, and with reference to FIGS. 1A and 1B, the container processing subsystem 14 comprises a fluid supply 12 that is operable to supply fluid to the container 6. The fluid is for example water or milk. The fluid may be conditioned (i.e. heated or cooled). The fluid supply 12 typically comprises: a reservoir 20 for containing fluid, for example 1-5 litres of fluid; a fluid pump 22, such as a reciprocating or rotary pump that may be driven by an electrical motor or an induction coil (although in embodiments the pump may be replaced with connection to an external fluid supply, for example to a mains water supply); an optional fluid thermal exchanger 24 (typically a heater or a cooler), which for example comprises an in-line, thermoblock type heater; an outlet for supplying the fluid. The reservoir 20, fluid pump 22, fluid thermal exchanger 24, and outlet are in fluid communication with each other in any suitable order to form a fluid line. The fluid supply 12 may optionally comprise a sensor to measure fluid flow rate and/or the amount of fluid delivered. An example of such a sensor is a flow meter, which may comprises a hall or other suitable sensor to measure rotation of a rotor, a signal from the sensor being provided to the control subsystem 16, as will be discussed.

Container Processing Subsystem for Extraction of Foodstuff/Beverage from Container According to embodiments, the container processing subsystem 14 is operable: to receive the container 6 containing material; process the container 6 to extract one or more ingredients of a beverage or foodstuff therefrom, and to dispense the said ingredients into an alternate receptacle for end-user consumption. The container is generally a single-use, single-serving container such as a capsule, a pod or a packet.

A container processing subsystem 14 for use with such a capsule or pod will initially be described, an example of which is shown in FIG. 1A. The container processing subsystem 14 comprises an extraction unit 26 operable to move between a capsule receiving position and a capsule extraction position. When moving from the capsule extraction position to the capsule receiving position the extraction unit 26 may be moved through or to a capsule ejection position, wherein a spent capsule can be ejected therefrom.

The extraction unit 26 receives fluid from the fluid supply 12. The extraction unit 26 typically comprises: an injection head 28; a capsule holder 30; a capsule holder loading system 32; a capsule insertion channel 34A; a capsule ejection channel or port 34B, which are described sequentially.

The injection head 28 is configured to inject fluid into a cavity of the capsule 6 when held by the capsule holder 30, and to this end has mounted thereto an injector, which has a nozzle that is in fluid communication with the outlet of the fluid supply 12.

The capsule holder 30 is configured to hold the capsule 6 during extraction and to this end it is operatively linked to the injection head 28. The capsule holder 30 is operable to move to implement the said capsule receiving position and capsule extraction position: with the capsule holder in the capsule receiving position a capsule 6 can be supplied to the capsule holder 30 from the capsule insertion channel 34A; with the capsule holder 30 in the capsule extraction position a supplied capsule 6 is held by the holder 30, the injection head 28 can inject fluid into the cavity of the held capsule, and one or more ingredients can be extracted therefrom. When moving the capsule holder 30 from the capsule extraction position to the capsule receiving position, the capsule holder 30 can be moved through or to the said capsule ejection position, wherein a spent capsule 6 can be ejected from the capsule holder 30 via the capsule ejection channel or port 34B.

The capsule holder loading system 32 is operable to drive the capsule holder 30 between the capsule receiving position and the capsule extraction position.

The aforedescribed extraction unit 26 is generally a pressurised extraction unit, e.g. the container is hydraulically sealed and subject to 5-20 bar during brewing. Generally the pump is an induction pump. The extraction unit may alternatively operate by centrifugation as disclosed in EP 2594171 A1, which is incorporated herein by reference.

The container processing subsystem 14 may alternatively or additionally comprise a dissolution unit configured as disclosed in EP 1472156 and in EP 1784344, which are incorporated herein by reference.

In the embodiment of the container comprising a packet, the container processing subsystem comprises an extraction and/or dissolution unit operable to receive the packet and to inject, at an inlet thereof, fluid from the fluid supply. The injected fluid mixes with material within the packet to at least partially prepare the beverage, which exits the packet via an outlet thereof. The container processing subsystem comprises: a support mechanism to receive an unused packet and optionally eject a spent packet; an injector configured to supply fluid to the packet from the outlet of the fluid supply. Further detail is provided in WO 2014/125123, which is incorporated herein by reference.

Container Processing Subsystem for Preparation of Foodstuff/Beverage in Container for End User Consumption According to other embodiments, an example of which is shown in FIG. 1B, the container processing subsystem 14 is generally operable to prepare material stored in a container 6 that is a receptacle, such as a cup, pot or other suitable receptacle configured to hold for example approximately 150-350 ml of prepared product. Herein the container processing subsystem 14 comprises a mixing unit, which for example comprises: an agitator unit 40; an optional auxiliary product unit 42; a thermal exchanger 44; and a receptacle support 46, which will be described sequentially.

The agitator unit 40 is operable to agitate material within the receptacle for at least partial preparation thereof. The agitator unit 40 may comprise any suitable mixing arrangement, e.g. a: planetary mixer; spiral mixer; vertical cut mixer. Typically the agitator unit 40 comprises: an implement for mixing having a mixing head for contact with the material; and a drive unit, such as an electric motor or solenoid, to drive the mixing implement. In a preferred example of a planetary mixer the mixing head comprises an agitator that rotates with a radial angular velocity W1 on an offset shaft that rotates with gyration angular velocity W2, such an arrangement is disclosed in WO 2014/067987, which is incorporated herein by reference.

The auxiliary product unit 42 is operable to supply an auxiliary product, such as a topping, to the container 6. The auxiliary product unit 42 for example comprises: a reservoir to store said product; an electrically operated dispensing system to effect the dispensing of said product from the reservoir. Alternatively or additionally, the auxiliary production unit comprises a dilution and/or an extraction unit as described above to effect the dispensing from said auxiliary product from a container 6 such as a packet or a capsule.

The thermal exchanger 44 is operable to transfer and/or extract thermal energy from the container 6. In an example of transfer of thermal energy it may comprise a heater such as thermoblock. In an example of extraction of thermal energy it may comprise heat pump such as a refrigeration-type cycle heat pump.

The receptacle support 46 is operable to support the container 6 during a preparation process such that the container remains stationary during agitation of the material therein by the agitator unit 40. The receptacle support 46 preferably is thermally associated with the thermal exchanger 44 such that transfer of thermal energy can occur with a supported receptacle.

In a variant of the above, the container processing subsystem further comprises a dispensing mechanism for receiving a container such as a packet or capsule and dispensing the associated material into the receptacle, where it is prepared. Such an example is disclosed in EP 14167344 A, which is incorporated herein by reference. In a particular embodiment with this configuration the container may be a partially collapsible container, whereby the container is collapsible to dispense material stored therein. Such an example is disclosed in EP 15195547 A, which is incorporated herein by reference. In particular a collapsible portion of the container comprises a geometric configuration and/or portion of weakening such that said portion collapses in preference to a retaining portion upon the application of axial load through both portions. In such an embodiment the container processing subsystem comprises a mechanical actuation device configured to apply an axial load to collapse said container, an example of which is provided in the reference application.

Other Container Processing Subsystems

In still further embodiments, the container processing subsystem for example comprises an extrusion head for extruding and possibly mixing one or more materials contained in one or more containers. In still other embodiments, the container processing subsystem for example comprises an oven and/or stove for heating the material contained in a container and preparing an edible foodstuff thereof.

Control Subsystem

Figure 2A:
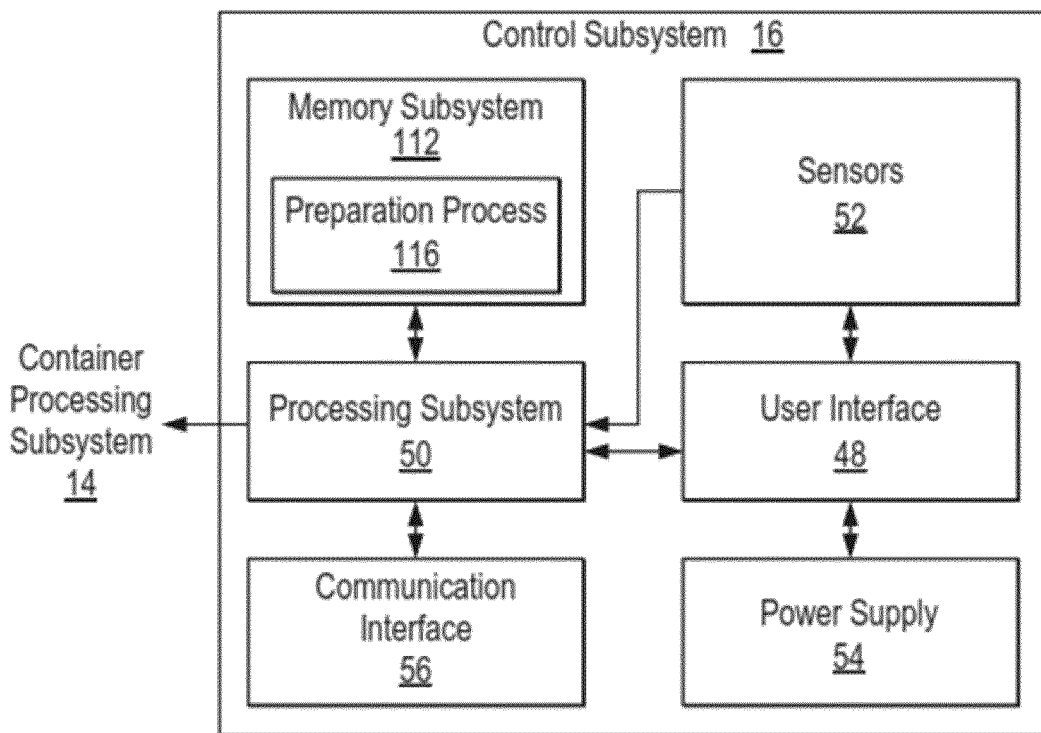
FIG. 2A is a block diagram of a control subsystem of a beverage or foodstuff preparation machine of the invention.

The control subsystem 16, an embodiment of which is illustrated in FIG. 2A, is operable to control the container processing subsystem 14 to prepare the beverage/foodstuff. The control subsystem 16 typically comprises: a user interface 48; a processing subsystem 50; optional sensors 52; a power supply 54, optional communication interface 56, which are described sequentially.

The user interface 48 comprises hardware to enable an end user to interface with the processing subsystem 50 and hence is operatively connected thereto. More particularly: the user interface 48 receives commands from a user; a user interface signal transfers the said commands to the processing subsystem 50 as an input. The commands may, for example, be an instruction to execute a preparation process. The hardware of the user interface 48 may comprise any suitable device(s), for example, the hardware comprises one or more of the following: buttons, such as a joystick button or press button; joystick; LEDs; graphic or character LDCs; graphical screen with touch sensing and/or screen edge buttons.

Optional sensors 52 are operatively connected to the processing subsystem 50 to provide an input for monitoring said process. The sensors 52 typically comprise one or more of the following: fluid temperature sensors; fluid level sensors; position sensors e.g. for sensing a position of the extraction unit 26; flow rate and/or volume sensors.

The processing subsystem 50 (which may be referred to as a processor) is generally operable to: receive an input, i.e. said commands from the user interface 48 and/or from the sensors 52 and/or preparation information decoded by the code processing subsystem 18, as explained further below; process the input according to program code stored on a memory subsystem 112 (or programmed logic); provide an output, which is generally the said preparation process 116. The process may be executed with open-loop control, or more preferably with closed-loop control using the input signal from the sensors 52 as feedback. The processing subsystem 50 generally comprises memory, input and output system components, which are arranged as an integrated circuit, typically as a microprocessor or a microcontroller. The processing subsystem 50 may comprise other suitable integrated circuits, such as: an ASIC; a programmable logic device such as an FPGA; an analogue integrated circuit such as a controller. The processing subsystem 50 may also comprise one or more of the aforementioned integrated circuits, i.e. multiple processors.

The processing subsystem 50 generally comprises or is in communication with a memory subsystem 112 (which may be referred to as a memory unit) for storage of the program code and optionally data. The memory subsystem 112 typically comprises: a non-volatile memory e.g. EPROM, EEPROM or Flash for program code and operating parameter storage; volatile memory (RAM) for data storage. The program code typically comprises a preparation program executable to effect a preparation process 116. The memory subsystem may comprise separate and/or integrated (e.g. on a die of the processor) memory.

The power supply 54 is operable to supply electrical energy to the processing subsystem 50, container processing subsystem 14, and the fluid supply 12 as will be discussed. The power supply 54 may comprise various means, such as a battery or a unit to receive and condition a mains electrical supply.

The communication interface 56 is for data communication between the preparation machine 4 and another device/system, typically a server system. The communication interface 56 can be used to supply and/or receive information related to the preparation process, such as container consumption information and/or preparation process information. The communication interface 56 can be configured for cabled media or wireless media or a combination thereof, e.g.: a wired connection, such as RS-232, USB, I$^2$C, Ethernet defined by IEEE 802.3; a wireless connection, such as wireless LAN (e.g. IEEE 802.11) or near field communication (NFC) or a cellular system such as GPRS or GSM. The communication interface 56 is operatively connected to the processing subsystem 50. Generally the communication interface comprises a separate processing unit (examples of which are provided above) to control communication hardware (e.g. an antenna) to interface with the master processing subsystem 50. However, less complex configurations can be used e.g. a simple wired connection for serial communication directly with the processing subsystem 50.

Code Processing Subsystem

Figure 2B:
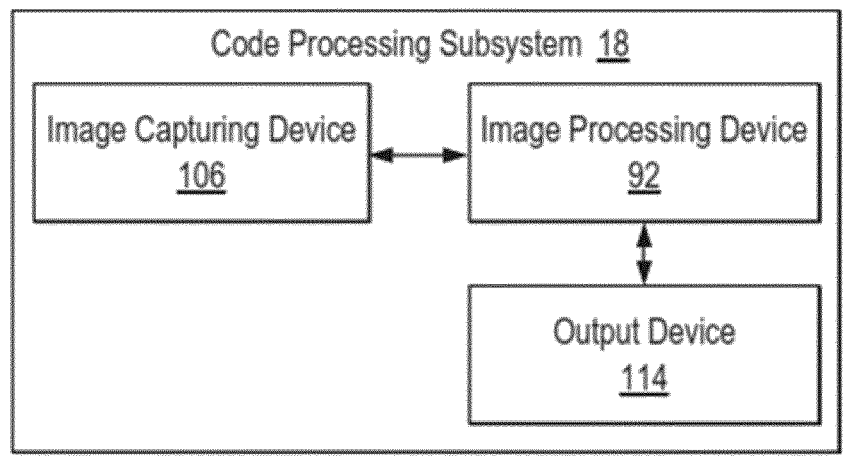
FIG. 2B is a block diagram of a code processing subsystem of a beverage or foodstuff preparation machine of the invention.

The code processing subsystem 18 is operable: to obtain an image of a code on the container 6; to process said image to decode the encoded information including for example preparation information. With reference to FIG. 2B, the code processing subsystem 18 comprises an: image capturing device 106; image processing device 92; output device 114, which are described sequentially.

The image capturing device 106 is operable to capture a digital image of the code and to transfer, as digital data, said image to the image processing device 92. To enable the scale of the digital image to be determined: the image capturing device 106 may be arranged a predetermined distance away from the code when obtaining the digital image; in an example wherein the image capturing device 106 comprises a lens the magnification of the lens is preferably stored on a memory of the image processing device 92. The image capturing device 106 comprises any suitable optical device for capturing a digital image consisting of the latter discussed micro-unit code composition. The code forming a micro-unit composition, the image capturing device may have very small dimensions, for example in the magnitude of a few millimetres or less, for example less than 2 mm in length, width and thickness, thereby facilitating its integration in a foodstuff/preparation machine 4, for example in the container processing subsystem 14. Such image capturing devices are furthermore mechanically simple and reliable pieces of equipment that will not impair the machine's overall functional reliability. Examples of suitable reliable optical devices are: Sonix SN9S102; Snap Sensor S2 imager; an oversampled binary image sensor.

The image processing device 92 is operatively connected to the image capturing device 106 and is operable to process said digital data to decode information, in particular preparation information encoded therein. Processing of the digital data is discussed in the following. The image processing device 92 may comprise a processor such as a microcontroller or an ASIC. It may alternatively comprise the aforesaid processing subsystem 50, in such an embodiment it will be appreciated that the output device is integrated in the processing subsystem 50. For the said processing the image processing device 92 typically comprises a code processing program. An example of a suitable image processing device is the Texas Instruments TMS320C5517.

The output device 114 is operatively connected to the image processing device 92 and is operable to output digital data that comprises the decoded preparation information to the processing subsystem 50, e.g. by means of a serial interface.

Container

The container 6 may comprise, depending on the embodiment of the container processing subsystem, a: receptacle comprising material for preparation and end-user consumption therefrom; a capsule, pod or packet comprising material for preparation therefrom. The container 6 may be formed from various materials, such as metal or plastic or a combination thereof. In general the material is selected such that it is: food-safe; it can withstand the pressure and/or temperature of the preparation process. Suitable examples of containers are provided following.

The container 6 when not in packet form generally comprises: a body portion 58 defining a cavity for the storage of a dosage of a material; a lid portion 60 for closing the cavity; a flange portion 62 for connection of the body portion and lid portion, the flange portion generally being arranged distal a base of the cavity. The body portion may comprise various shapes, such as a disk, frusto-conical or rectangular cross-sectioned. Accordingly, it will be appreciated that the capsule 6 may take various forms, an example of which is provided in FIG. 3A, which may generically extend to a receptacle or capsule as defined herein. The container 6 may be distinguished as a receptacle for end-user consumption therefrom when configured for example with an internal volume of 150-350 ml and preferably a diameter of 6-10 cm and axial length of 4-8 cm. In a similar fashion a capsule for extraction may be distinguished for example when configured with an internal volume of less than 100 or 50 ml and preferably a diameter of 2-5 cm and axial length of 2-4 cm. The container 6 in collapsible configuration may comprise an internal volume of 5 ml-250 ml. In embodiments, the container's cavity may be divided in a plurality of compartments, for example two, three or more compartments, each compartment containing a material possibly different from the material contained in the other compartments. The different materials of the various compartments may for example be processed simultaneously or sequentially by the container processing subsystem 14. Examples of such containers and their processing by an appropriate container processing subsystem are for example described in WO 2007/054479 A1, WO 2014/057094 A1 and unpublished application EP 17151656.0, which are all incorporated herein by reference.

Figure 3A:
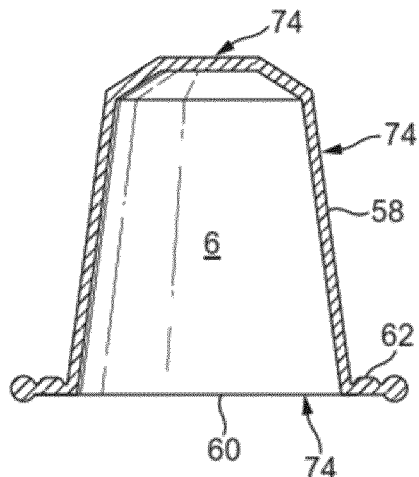
FIG. 3A is a cut view of an exemplary container according to the invention.
Figure 3B:
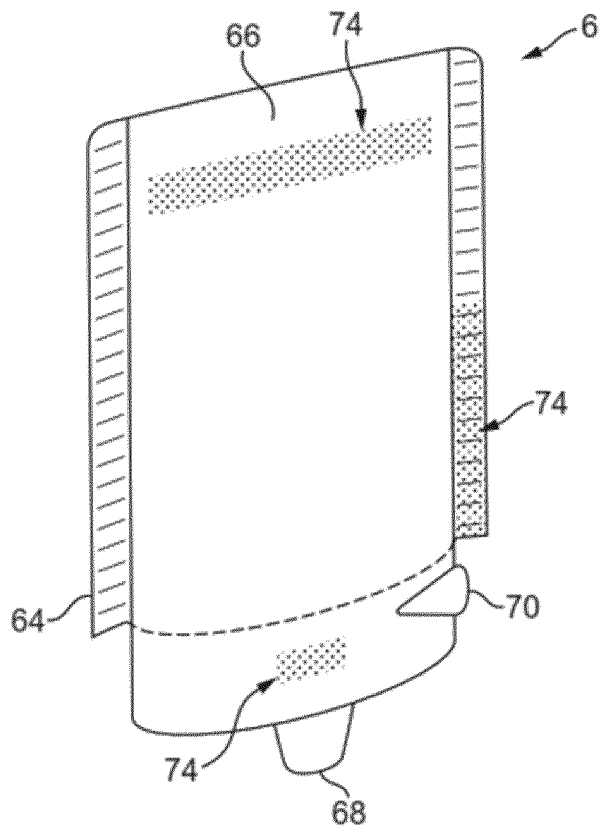
FIG. 3B shows another example of a container according to the invention.

The container 6 when in packet form, an example of which is provided in FIG. 3B, for example comprises: an arrangement of sheet material 64 (such as one or more sheets joined at their periphery) defining an internal volume 66 for the storage of a dosage of a material; an inlet 68 for inflow of fluid into the internal volume 66; an outlet 70 for outflow of fluid and material from the internal volume. The inlet 68 and outlet 70 are for example arranged on a body of an attachment (not shown), which is attached to the sheet material. The sheet material may be formed from various materials, such as metal foil or plastic or a combination thereof. The internal volume 66 may for example be 150-350 ml or 200-300 ml or 50-150 ml depending on the application. In embodiments, the internal volume of the container may be divided in a plurality of compartments, for example two or three compartments, each compartment containing a material possibly different from the material contained in the other compartments. The different material of the various compartments may for example be processed simultaneously or sequentially by an appropriate container processing subsystem.

Other types of containers are however possible within the frame of the invention, the volume, shape, material and/or configuration of the containers being adapted to the nature and configuration of the container processing subsystem.

Information Encoded by Code

A code 74 of the container 6 encodes preparation information, which generally comprises information related to the preparation process associated with the material contained in the container 6. Depending of the embodiment of the container processing subsystem, said information may encode values of one or more preparation parameters, which may comprise one of more of a: fluid pressure; fluid temperature (at container inlet and/or outlet to receptacle); fluid mass/volumetric flow rate; fluid volume; oven temperature; stove temperature; extrusion parameters; phase identifier, for when a preparation process is split into a series of phase, whereby each phase comprises a set of one or more of the aforesaid parameters (there may be for example 2-10 phases); phase duration (e.g. a duration for applying the parameter values of a phase); recipe and/or container and/or compartment identifier, for when a recipe requires processing material contained in two or more containers and/or container compartments; container geometric parameters, such as shape/volume/number of ingredient compartments; other container parameters e.g. a container identifier, which may be used to monitor container consumption for the purpose of container re-ordering, an expiry date, a recipe identifier, which may be used to look-up a recipe stored on the memory of the beverage machine for use with the container.

Specifically in respect of a preparation machine 4 such as the one illustrated in FIG. 1A said parameters whose values are encoded may comprise any one or more of a: fluid pressure; fluid temperature; fluid volume; fluid flow rate; time of a particular phase of preparation for which the aforesaid one or more parameter values are applied for; phase identifier, e.g. an alphanumeric identifier, to identify to which of a plurality of phases the aforesaid one or more parameter values relate; recipe identifier; pre-wetting time, which is the amount of time the material of the container may be soaked for during an initial preparation phase; pre-wetting volume, which is the amount of fluid volume applied during said phase.

Specifically in respect of a preparation machine 4 such as the one illustrated in FIG. 1B said parameters whose values are encoded may comprise one or more of a: percentage cooling or heating power to apply (e.g. the power applied by the thermal exchanger 44); torque applied by the agitator unit 40; one or more angular velocities (e.g. a gyration and radial angular velocities); container temperature (e.g. the temperature set by the thermal exchanger 44); time of a particular phase of preparation for which the aforesaid one or more parameter values are applied for; phase identifier, e.g. an alphanumeric identifier, to identify to which of a plurality of phases the aforesaid one or more parameter values relate.

In embodiments, the code 74 further encodes additional information. The additional information for example comprises product and/or tracing information such as one or more of a: product name; product identifier; factory identifier; production line identifier; production date; production time; batch identifier. The additional information may for example also comprise consumer related information such as for example personalised and/or customised preparation information.

Arrangement of Code

The code 74 is arranged on an exterior surface of the container 6 in any suitable position such that it can be processed by the code processing subsystem 18. In the afore-discussed example of a receptacle/capsule 6, as shown in FIG. 3A, the code 74 can be arranged on any exterior surface thereof, e.g. the lid, body and/or flange portion. In the afore-discussed example of a packet 6, as shown in FIG. 3B, the code 74 can be arranged on any exterior surface thereof, e.g. either or both sides of the packet, including the rim.

A plurality of codes 74 can be formed on the container 6, e.g.: for read error checking; and/or for encoding parameter values related to separate phases of a preparation process, the parameter values for each phase being encoded by each code or a series of codes. In particular the planform of the code (as will be discussed) may comprise an at least partially tessellating shape, e.g. a polygon such as an hexagon or a rectangle, for example a square, whereby the codes are formed on a container in an at least partially tessellating manner (e.g. a grid with adjacent columns aligned or with adjacent columns offset).

Composition of Code

Figure 4A:
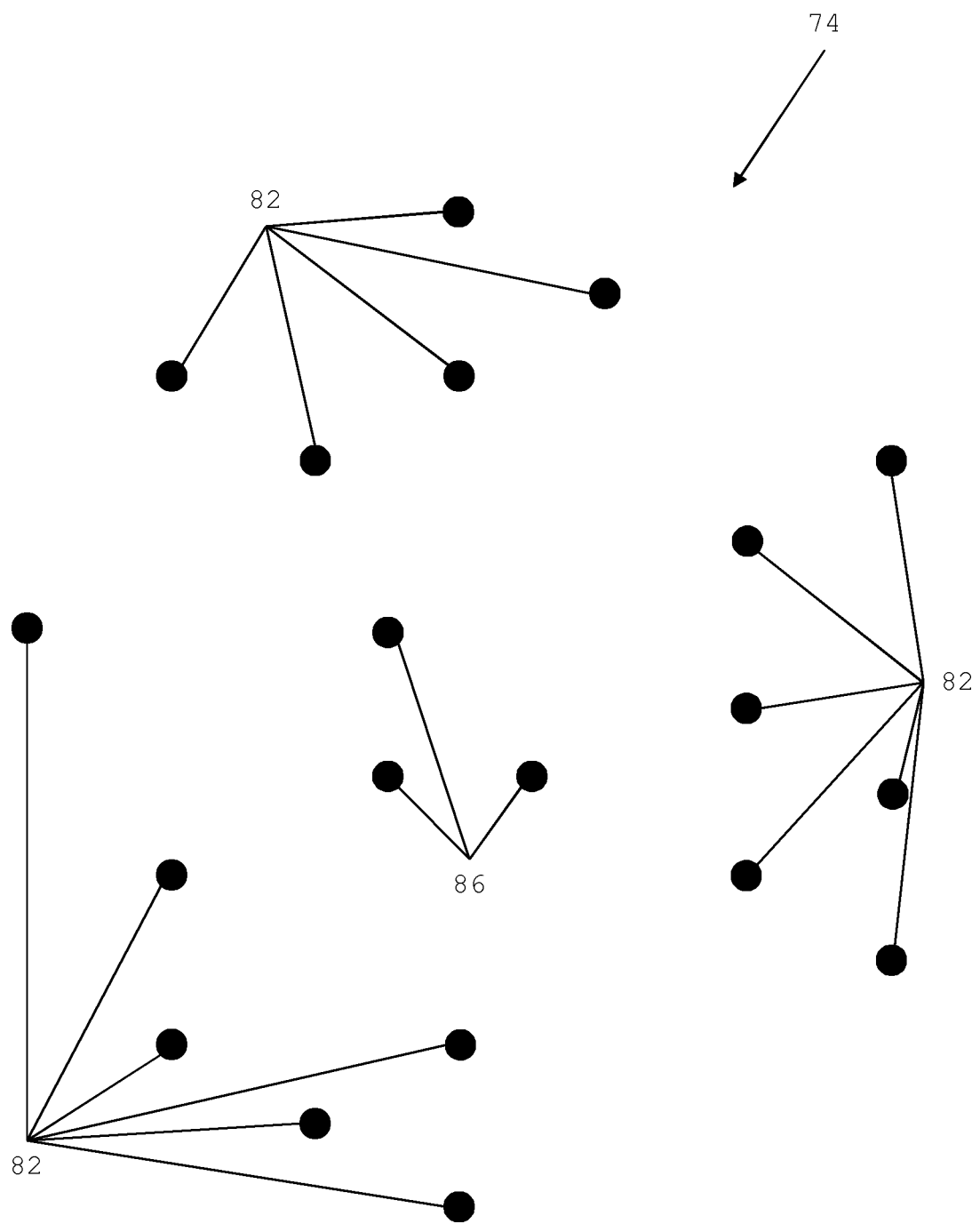
FIG. 4A shows an example of a code of a container according to the invention.

The code 74, an example of which is shown in FIG. 4A, is configured to encode preparation information in a manner for capturing by the image capturing device of the code processing subsystem of the beverage or foodstuff preparation machine of the invention.

In preferred embodiments, the code 74 is formed of a plurality of units 82, 86, preferably micro-units, with a surround of a different colour: typically the units 82, 86 comprise a dark colour (e.g. one of the following: black, dark blue, purple, dark green) and the surround comprises a light colour (e.g. one of the following: white, light blue, yellow, light green) or the converse, such that there is sufficient contrast for the image processing device 92 to distinguish therebetween. In embodiments, the units 82, 86 are formed, for example printed, with invisible ink, such that they can only be distinguished from the surround when lightened with a particular wavelength radiation, such as for example ultraviolet light, and/or captured by an appropriate image capturing device.

The units 82, 86 may have one or a combination of the following shapes: circular; triangular; polygonal, in particular a quadrilateral such as square or parallelogram; other known suitable shape. It will be appreciated that due to formation error, e.g. printing error, the aforesaid shape can be an approximation of the actual shape. The units 82, 86 preferably have a unit length of 50-200 μm, e.g. 60, 80, 100, 120, 150 μm. The unit length is a suitably defined distance of the unit, e.g.: for a circular shape the diameter; for a square a side length; for a polygon a diameter or distance between opposing vertices; for a triangle a hypotenuse. The units 82, 86 are preferably arranged with a precision of a few microns, preferably of about 1 μm.

Whilst the code is referred to as comprising a plurality of units 82, 86 it will be appreciated that the units 82, 86 may alternatively be referred to as elements 82, 86 or markers 82, 86.

Typically the units 82, 86 are formed by: printing e.g. by means of an ink printer; embossing; engraving; other known means; a combination thereof. As an example of printing the ink may be conventional printer ink and the substrate may be: polyethylene terephthalate (PET); aluminium coated with a lacquer, as found for example on Nespresso™ capsules, or other suitable substrate. As an example of embossing the shape may be pressed into a plastically deformable substrate, such as for example the aforesaid aluminium coated with a lacquer, by a stamp. The costs of forming the code on a container or on an attachment of the invention may thus be kept low by using conventional and inexpensive technologies, e.g. ink-jet, off-set, or laser printing, such that they don't significantly impact the costs of production of the container or attachment.

Figure 4B:
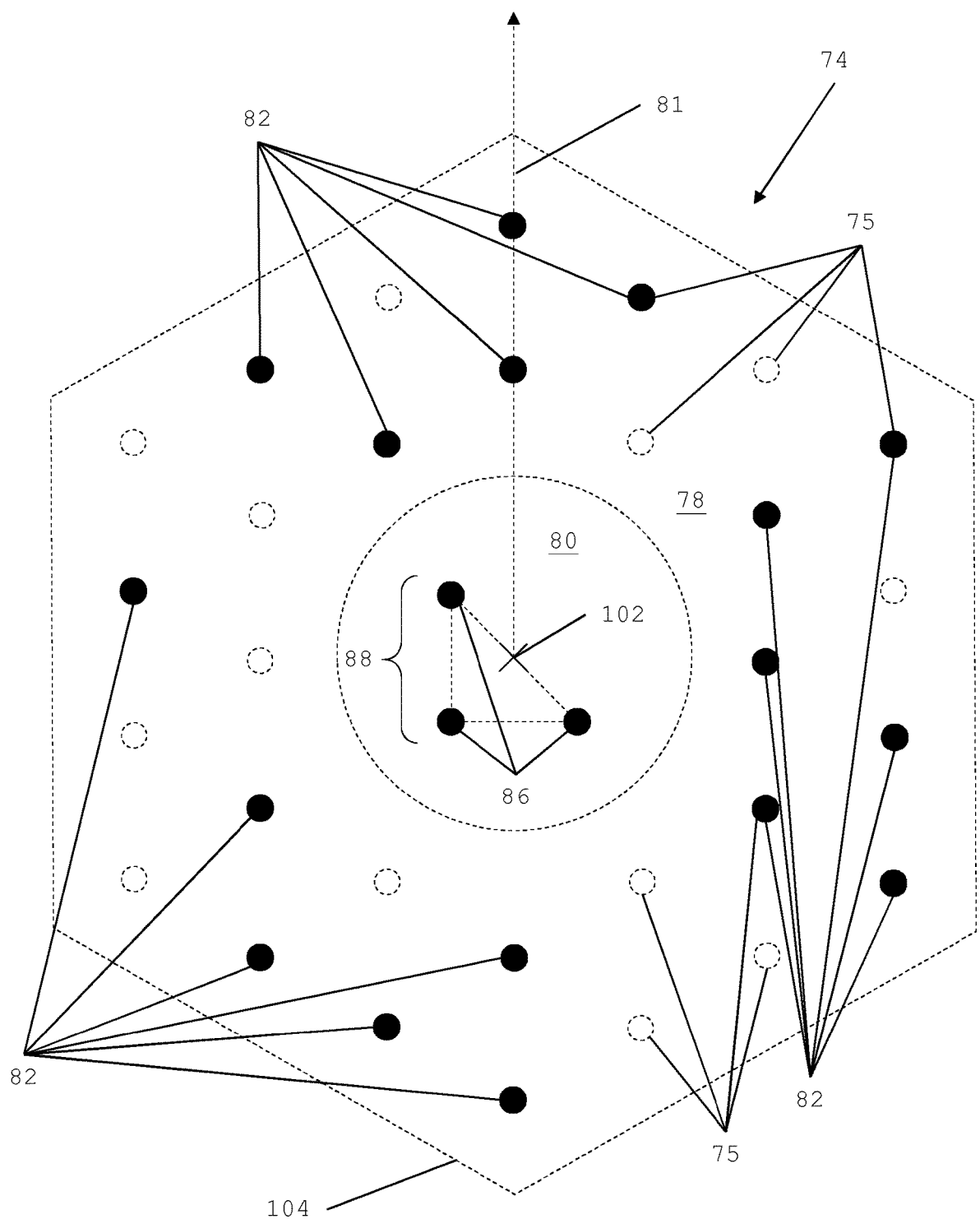
FIG. 4B shows the code of FIG. 4A with virtual elements of the code in dotted lines.

As illustrated in FIG. 4B, the code comprises a virtual planform 104, within which the units 82, 86 are arranged. The planform 104 may be circular, rectangular, or polygonal, for example hexagonal as shown in FIG. 4A. Typically the planform 104 has a length (i.e. a diameter for a circular or polygonal planform and a side length for a square planform) of 600-1600 μm, or about 1100 μm. The size of the planform may however be defined to be larger, depending for example on the amount of information to be encoded, as will be explained further below.

The units 82, 86 are organised into a data portion 78 to encode preparation information and a reference portion 80 to provide a reference for the data portion 78.

The reference portion 80 comprises a reference configuration defining a preferably virtual reference line 81, which provides a reference direction for angular reference by the data portion 78 as will be discussed. In embodiments, the reference configuration comprises reference units 86 arranged in a specific pattern. The reference units 86 are for example arranged at the periphery, typically at the vertices, of a preferably virtual two-dimensional reference geometric shape. In preferred embodiments, the reference portion 80 for example comprises three reference units 86 arranged at the vertices of a virtual reference triangle 88, preferably an isosceles triangle. A virtual reference point 102 is for example defined relative to the reference triangle 88, from which the virtual reference line 81 extends in a direction, which is also defined relative to the reference configuration. The virtual reference point 102 is for example defined as the middle point of the basis of the reference triangle 88, while the direction of the virtual reference line 81 is defined as being parallel to a leg of the reference triangle 88, as illustrated in FIG. 4B.

Other arrangements of the reference units 86 are however possible within the frame of the invention. In particular, the number of reference units 86 and/or the reference shape formed therewith may be different from the embodiment described above and illustrated in the figures. Furthermore, the reference configuration may alternatively or additionally comprise one or more elements other than reference units 86 in order to provide a reference for the data portion 78, such as for example a non-virtual two-dimensional shape, from which a reference point and a reference direction may be univocally determined by the image processing device of the preparation machine of the invention. An advantage, however, of a reference portion 80 comprising three reference units 86 arranged at the vertices of a reference triangle 88 is that it provides for a simple and compact reference configuration allowing to univocally define a reference direction and a reference point, from which, for example, any appropriate two-dimensional coordinate system, for example a polar or a scalar coordinate system, may be derived.

The data portion 78 comprises a plurality of virtual discrete positions 75 defined at known locations within the code's planform 104. The discrete positions 75 are preferably arranged around the reference portion 80, for example around the reference triangle 88. In the embodiment of FIG. 4B, the data portion 78 for example comprises thirty discrete positions 75 arranged on the periphery of two concentric hexagons surrounding the reference configuration. The locations of the discrete positions 75 are defined relative to the reference line 81, i.e. relative to the reference configuration, as explained further below. The code 74 of the invention typically allows encoding preparation information in a binary manner by forming data units 82 at selected discrete positions 75, wherein each discrete position 75 typically corresponds to a particular data bit. The value of a particular data bit is for example interpreted as a "1" if the corresponding discrete position comprises a data unit 82, and as a "0" if the corresponding discrete position is empty, i.e. if it doesn't comprise any data unit, or the converse.

In the example illustrated in FIG. 4A, the code 74 encodes preparation information in that seventeen selected discrete positions 75 of the thirty available discrete positions comprise a data unit 82. The signification of each data bit may vary from an application to another, depending for example on the nature and/or quantity of information to be encoded. The available data bits, depending on the number of discrete positions 75, may for example be divided in data blocks of one, two three or more data bits, each data block encoding for example a discrete value of a different parameter of the preparation information. The number of discrete positions 75 of the data portion 78 is typically chosen based on the amount of information to be encoded.

Virtual elements of the code, such as for example the planform 104, the reference triangle 88, the reference point 102, the reference line 81 and the discrete positions 75 that do not comprise a data unit 82, are illustrated in some figures in dotted lines for explanation purposes. They are however preferably not formed, for example not printed and/or embossed, on the container and/or the attachment of the invention, such that only the data and reference units 82, 86 are formed, as illustrated for example in FIG. 4A.

Detailed Description of Code

Figure 5A:
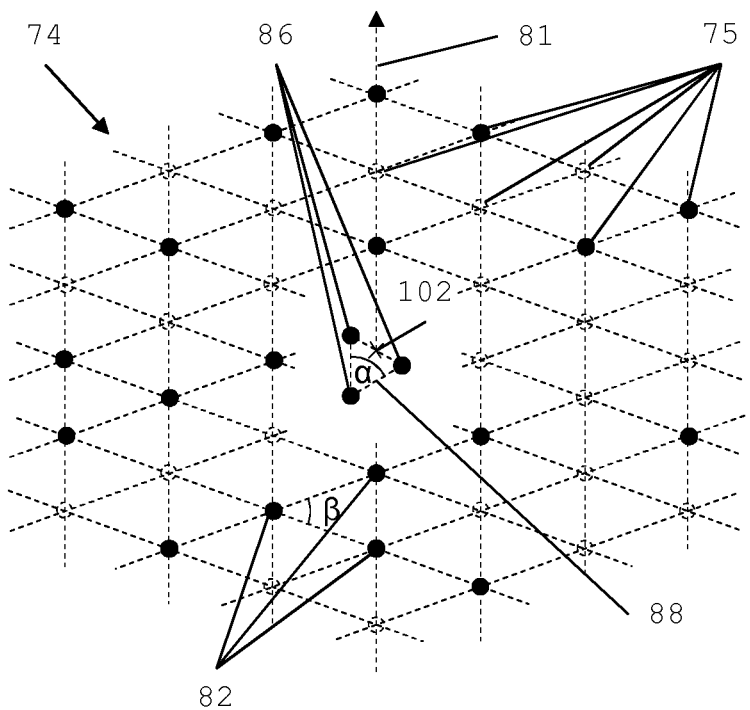
FIG. 5A shows an embodiment of the code of the invention.

FIG. 5A illustrates the determination of the locations of the discrete positions 75 of the code 74 of the invention relative to the reference line 81, i.e. relative to the reference configuration. According to the invention, the discrete positions 75 are located at the vertices of tessellating isomorphic isosceles virtual data triangles, i.e. at the intersections of a virtual triangular grid formed by said tessellating data triangles. The virtual data triangles are preferably aligned relative to the virtual reference line 81, typically in that one of their sides, for example their basis, is parallel to the reference line 81. In preferred embodiments, the discrete positions 75 are arranged at vertices, or intersections, located around the reference configuration, for example around the reference triangle 88, thus forming concentric rows, or part thereof, around the reference configuration. The discrete positions 75 are for example arranged along the periphery of one, two or more concentric virtual polygons, or parts thereof, that are for example centred on the reference point 102. The number of thus formed concentric rows, or row portions, typically depends on the number of discrete positions 75 required for encoding the desired information.

Preferably, the discrete positions 75 are not arranged closer than a minimal distance to the reference configuration in order to allow the code processing subsystem of the preparation machine of the invention discriminating a data unit 82 arranged at such a discrete position 75 from elements of the reference configuration, typically from the reference units 86. In the illustrated embodiments, for example, the minimal distance between the discrete positions 75 and the reference units 86 is typically chosen to be longer than the length of any side of the reference triangle 88.

For the sake of legibility, not all discrete positions 75 and not all data units 82 are explicitly designated by a corresponding reference numeral in all figures. The reader will nevertheless understand that the reference numeral 75 designates all the illustrated discrete positions, whether they comprise a data unit 82 or not, and that the reference numeral 82 designates all the illustrated data units 82 arranged at discrete positions 75.

According to embodiments, in order to differentiate the reference units 86 located at the vertices of the reference triangle 88 from data units 82 located at discrete positions 75, in particular from three data units 82 located at the vertices of a same data triangle, the data apex angle β of the data triangles is different from the reference apex angle α of the reference triangle 88. The reference and data apex angles are preferably such that no combination of three data units 82 located at any three discrete positions 75 of the code 74 forms an isosceles triangle having an angle equal to the reference apex angle α, thereby allowing a univocal identification of the reference triangle 88. Preferably, the data apex angle β is chosen to be neither a multiple nor a divisor of the reference apex angle α of the reference triangle 88.

Figure 5B:
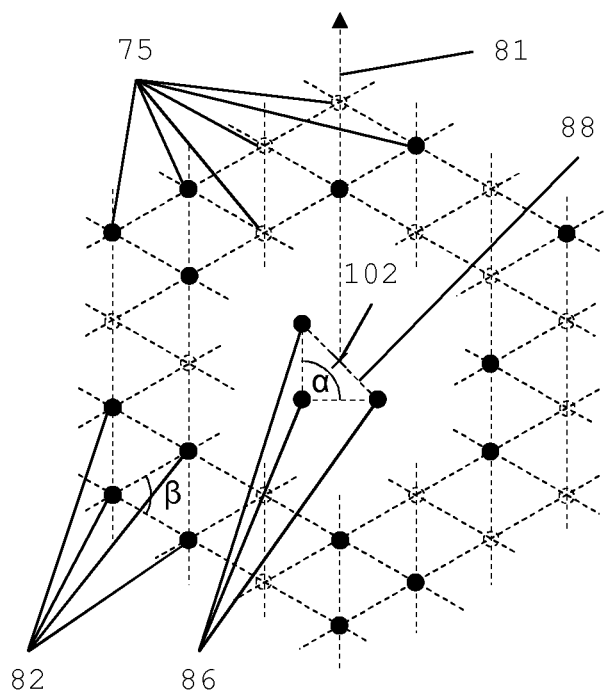
FIG. 5B shows another embodiment of the code of the invention.

In preferred embodiments, as illustrated for example in FIG. 5B, the reference apex angle α is equal to 90° while the data apex angle β is equal to 60°. Accordingly, the reference triangle 88 is a right-angled isosceles triangle while the data triangles are equilateral triangles. This particularly advantageous angle combination greatly facilitates discrimination of the reference units 86 amidst the data units 82 by making the reference triangle 88 easily recognizable. The use of a right-angled reference triangle 88 furthermore allows a univocal and easy determination of the direction of the reference line 81, for example parallel to the upright leg of the "L" formed by the three reference units 86.

Furthermore, the lengths of the sides of the data triangles are preferably different from, for example longer than, the lengths of the sides of the reference triangle 88.

Method of Encoding Information

Figure 6A:
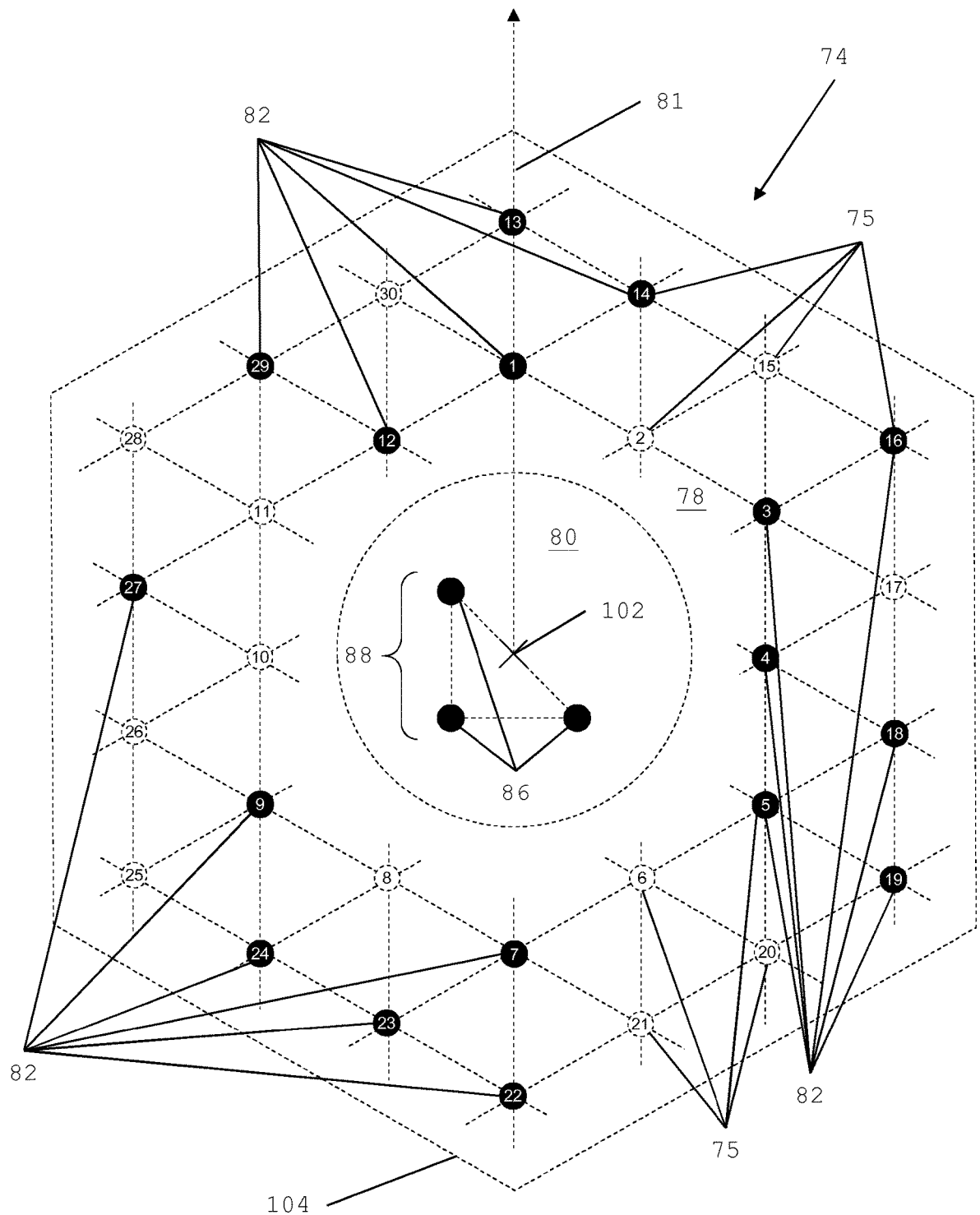
FIG. 6A shows a further example of a code of the invention with virtual elements of the code in dotted lines.

Encoding preparation information in a code 74 according to the invention will now be discussed with reference to the exemplary embodiment illustrated in FIG. 6A.

Generating a code 74 according to the invention for encoding preparation information is preferably performed with the help of a computer or any other appropriate computing device running a corresponding piece of software. The resulting image of the code 74, which is typically a computer generated image, is then printed and/or embossed on a container and/or on an attachment according to the invention, using preferably conventional techniques.

In a first step, the data portion 80 of the code 74 is generated by generating the reference configuration, for example by arranging three reference units 86 at the vertices of the virtual reference triangle 88. The reference triangle 88 is for example a right-angled isosceles triangle with known dimensions.

In a second step, the position and orientation of the virtual reference line 81 is determined on the basis of the reference configuration, based for example on the location and orientation of the reference triangle 88. In embodiments, the virtual reference point 102 from which the virtual reference line 81 extends is for example determined to be the midpoint of the basis of the virtual reference triangle 88. The reference line 81 is then determined to extend in a direction defined relative to the reference configuration, for example parallel to a direction defined by at least two reference points 86. In preferred embodiments, the reference line 81 is for example defined to extend in a direction parallel to the upright leg of the "L" formed by the three reference units 86 arranged at the vertices of the right-angled reference triangle 88.

In a next step, the virtual triangular grid is defined within the planform 104 of the code 74. The grid is preferably arranged around the reference configuration. The virtual triangular grid comprises tessellating virtual data triangles, which are preferably isosceles triangles, more preferably congruent equilateral triangles as illustrated in FIG. 6A. In embodiments, the length of the sides of the data triangles is preferably chosen to be different from the length of the sides of the reference triangle 88 in order to facilitate discrimination of the reference units 86 from data units 82 located at vertices of a same data triangle. According to the invention, the orientation of the triangular grid is defined relative to the direction of the virtual reference line 81. The triangular grid is for example aligned with the reference line 81 in that a side of each data triangle is oriented parallel to the reference line 81. In preferred embodiments, at least some of the tessellating data triangles have a side aligned on the reference line 81, as illustrated for example in the embodiment of FIG. 6A.

In a next step, virtual discrete position 75 is defined at selected intersections of the triangular grid, i.e. at selected vertices of the data triangles. The discrete position 75 is preferably defined at intersections that are located at a distance from the reference configuration equal to or greater than a predefined minimal distance in order to allow a clear discrimination, by the code processing subsystem of the preparation machine of the invention, between a data unit 82 arranged at one of the discrete positions 75 and an element of the reference configuration, typically a reference unit 86. The minimal distance typically depends on the size of the reference configuration, on the size of the units 82, 86 and/or on the resolution of the imaging device of the preparation machine.

In the illustrated example, thirty discrete positions 75 are defined on two concentric rows, along the periphery of two concentric hexagons surrounding the reference triangle 88. Each discrete position 75 is identifiable by its unique location relative to the reference line 81 and reference point 102, i.e. relative to the reference configuration. The location of each discrete position 75 may for example be defined relative to the reference point 102 and the reference line 81 and expressed in angular coordinates, Cartesian coordinates, and/or any other appropriate coordinate system. For explanation purposes only, each discrete positions 75 is identified in FIG. 6A by a unique number between one and thirty. The number and/or the layout of the discrete positions 75 may vary within the frame of the invention. In particular, the number of discrete positions 75 is preferably chosen sufficiently large to allow encoding all the necessary preparation information. Preferably, the number of discrete positions 75 is chosen equal to or greater than the number of data bits required to encode said information in a binary manner, each data bit being assigned to a different discrete position 75. In the illustrated embodiment, a first data bit $b_1$ is for example assigned to discrete position number one, a second data bit $b_2$ to discrete position number two, etc., up to discrete position number thirty, at the maximum. Each data bit is then encoded in the code 74 by arranging or not a data unit 82 at the corresponding discrete position 75. The presence of a data bit 82 for example encodes a "1", while no data bit encodes a "0", or the converse. According to this scheme, the data bit string "$b_1b_2b_3b_4b_5b_6b_7b_8b_9b_{10}b_{11} \ldots b_{30}$" encoded in the example of FIG. 5 is thus for example "101110101001110101100111001010".

The correspondence between the data bits and the preparation information typically depends on the amount and the nature of the information to be encoded. A parameter may for example be encoded on three data bits and can therefore take on eight different discrete values, i.e. up to eight different values may be encoded for the particular parameter. Another parameter may be encoded on the next four data bits, etc. The parameters for example comprise one or more of a temperature, a time duration, a volume, a rotation speed, etc. The correspondence between the data bit value combinations and the encoded discrete parameter value are for example stored in a correspondence table and/or determined with a known correspondence function. In embodiments, at least some data bits may encode information related to the content of the corresponding container, such as for example a product identifier, a production and/or validity date, etc.

Figure 6B:
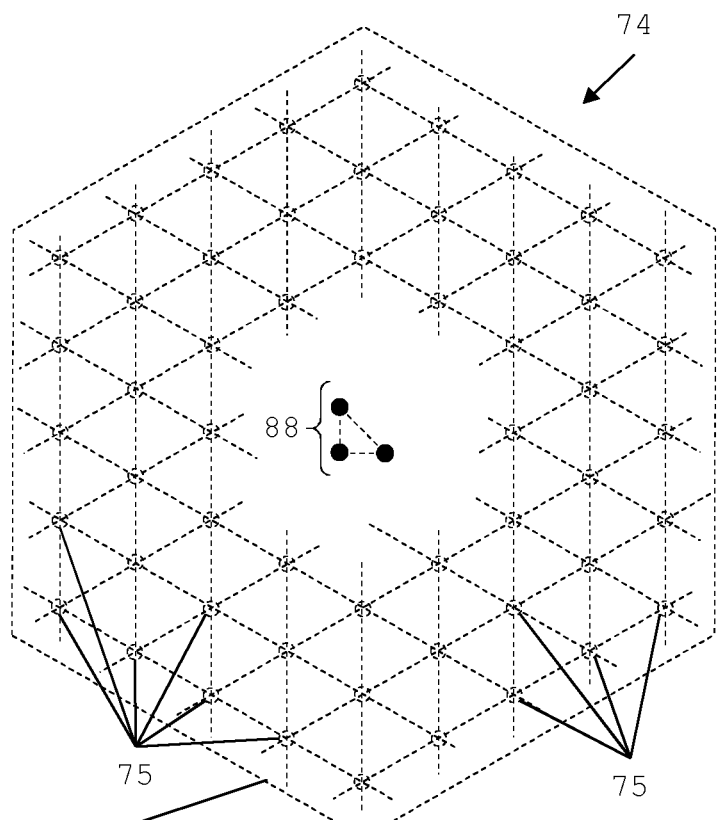
FIGS. 6B and 6C show variant embodiments of the code of the invention.

FIG. 6B illustrates another exemplary embodiment of a code 74 according to the invention, wherein fifty-four discrete positions 75 are defined within a hexagonal planform 104 around the reference configuration, for example a reference triangle 88.

Figure 6C:
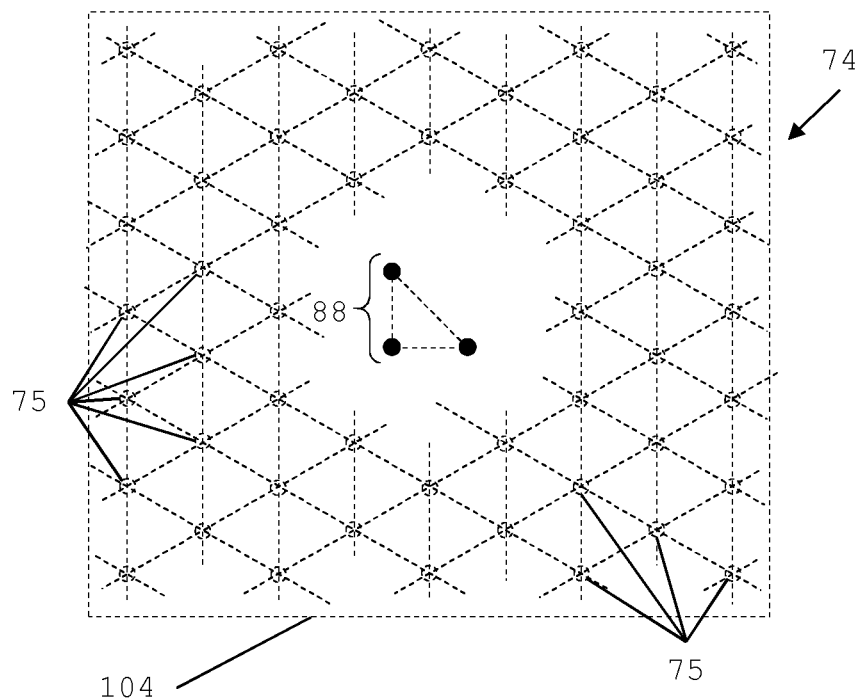

FIG. 6C shows yet another embodiment of the code 74 of the invention, wherein fifty-two discrete positions 75 are defined around a reference triangle 88 and within a square planform 104.

Method of Processing Code

Decoding information from a code 74 according to the invention will now be explained with reference to FIGS. 7A-7D.

Figure 7A:
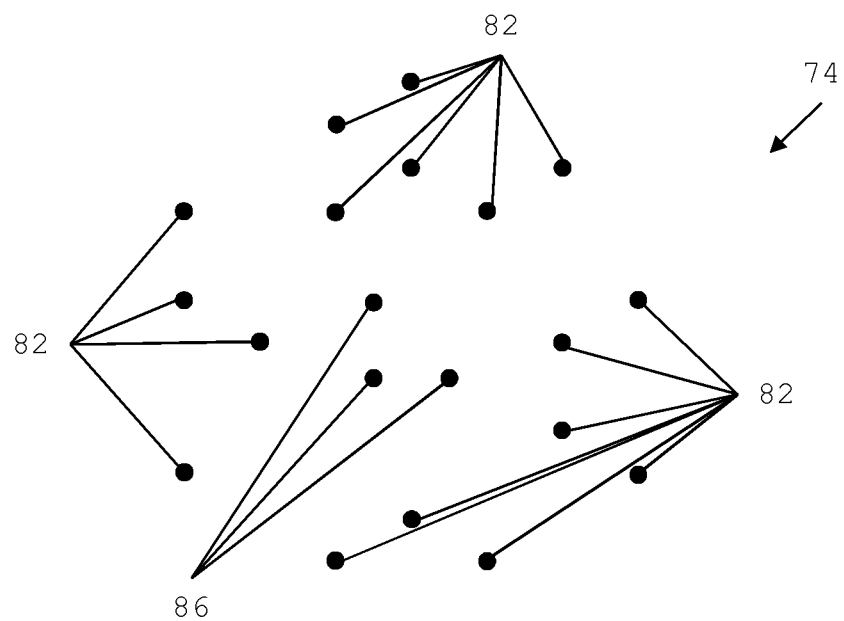
FIGS. 7A to 7D illustrate the steps of decoding the code of a container according to an embodiment of the invention in order to retrieve encoded information.

FIG. 7A shows a code 74 according to an embodiment of the invention with information encoded in a binary manner as it may for instance appear once formed for example on a container or on an attachment of the invention. In order to decode the information encoded in the code 74, the code processing subsystem of the preparation machine of the invention first captures an image of the code 74 with the image capturing device. The thus captured digital image of the code 74 is then processed by the image processing device to detect the units 82, 86 and determine for example their relative positions in the image.

Figure 7B:
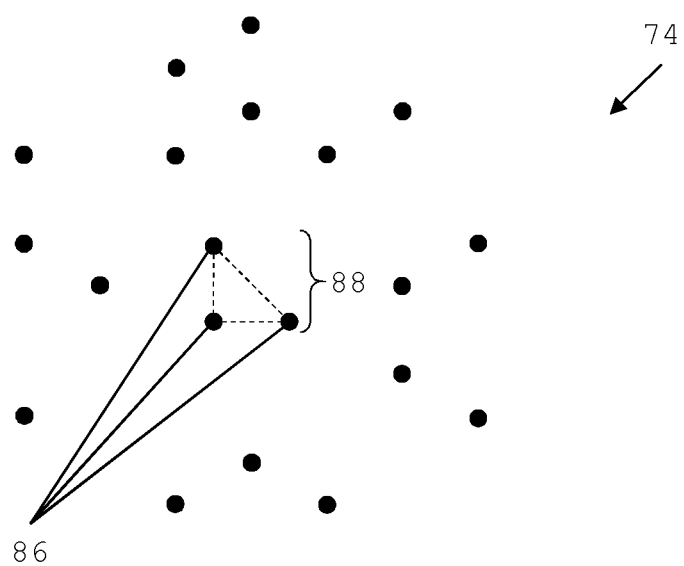

The code processing subsystem then looks for the known reference configuration in the image, for example by looking for units 86 arranged in a known and unique reference configuration, for example at the vertices of a virtual right-angled isosceles triangle 88, as illustrated in FIG. 7B.

Figure 7C:
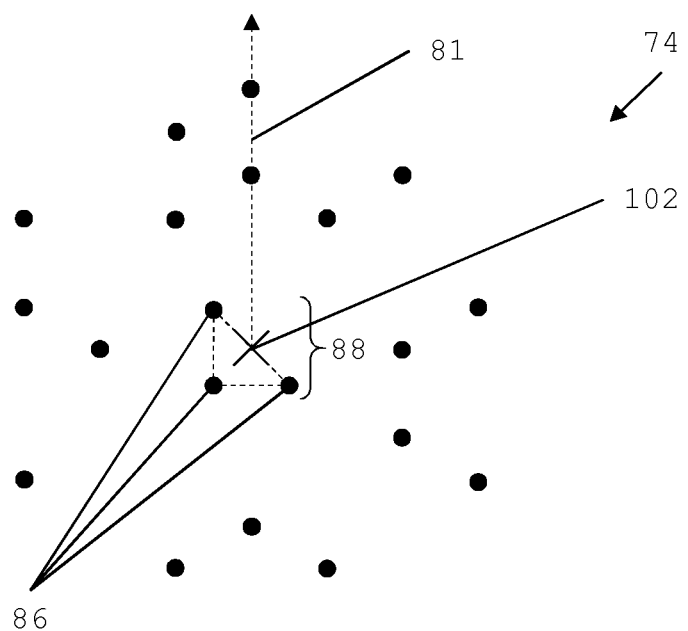

With reference to FIG. 7C, once the reference configuration is identified, the location and direction of the virtual reference line 81 are determined. The code processing subsystem of the preparation machine of the invention thus computes the location and orientation of the virtual reference line 81 based on the previously determined location and orientation of the reference configuration, for example on the basis of the locations of the previously identified reference points 86. In embodiments, the virtual reference point 102, from which the virtual reference line 81 extends, is for example known from the code processing subsystem to be the midpoint of the basis of the virtual reference triangle 88, i.e. the midpoint between the two reference units 86 determined to be located at the extremities of said basis, and the virtual reference line 81 is for example known to extend parallel to a specific leg of said reference triangle 88, i.e. parallel to a direction defined by the two reference points 86 determined to be located at the extremities of this specific leg.

Figure 7D:
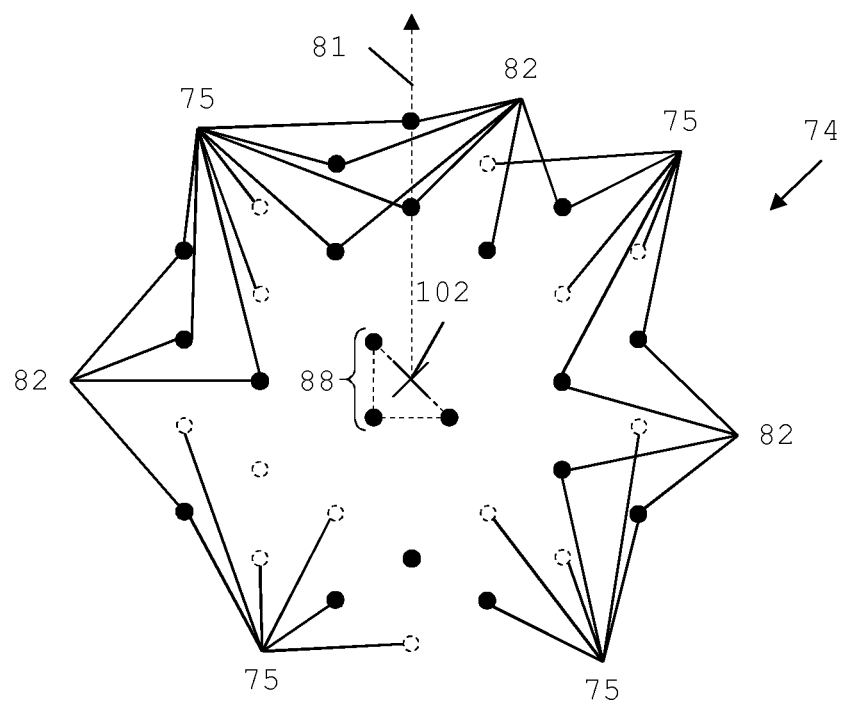

Referring now to FIG. 7D, the code processing subsystem then computes the locations of the discrete positions 75, based on their known locations relative to the reference configuration, i.e. relative to the reference line 81. The code processing subsystem then processes the captured image of the code 74 to determine for each discrete position 75 whether it comprises a data unit 82 or not. The code processing subsystem then for example assigns a "1" to data bits corresponding to discrete positions comprising a data unit 82, and a "0" to data bits corresponding to discrete positions 75 that do not comprise a data unit 82, or the converse. The thus recovered data bit string, or series of data bit blocks, is then decoded in a conventional manner into corresponding information, including in particular preparation parameter values, using one or more known correspondence functions and/or stored correspondence tables.

Arrangement of Codes

Figure 8A:
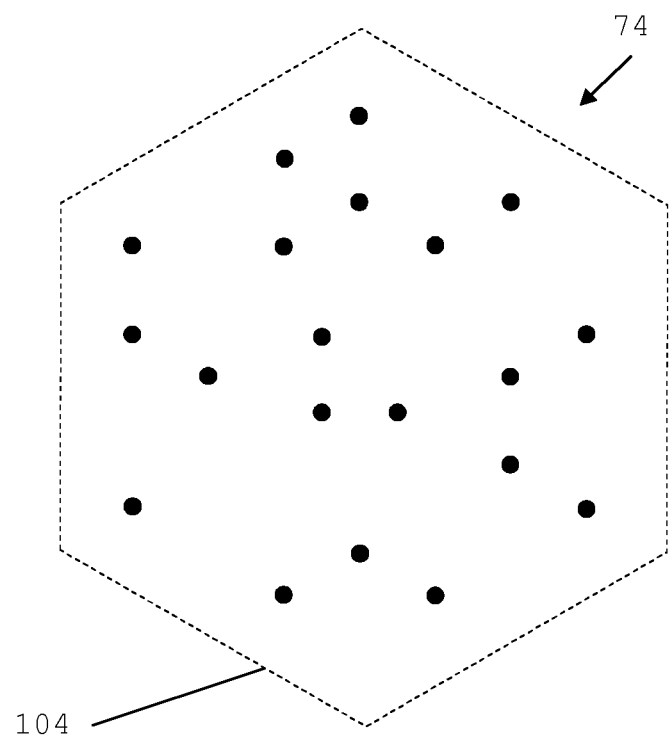
FIG. 8A shows an embodiment of a code having a hexagonal planform.

In preferred embodiments, the code 74 of the invention comprises a regular geometric virtual planform 104, for example a regular hexagonal planform as illustrated in FIG. 8A. Such planform 104 typically allows forming a plurality of codes 74 in a tessellating manner on a single surface, as illustrated for example in FIG. 8B-8D.

Figure 8B:
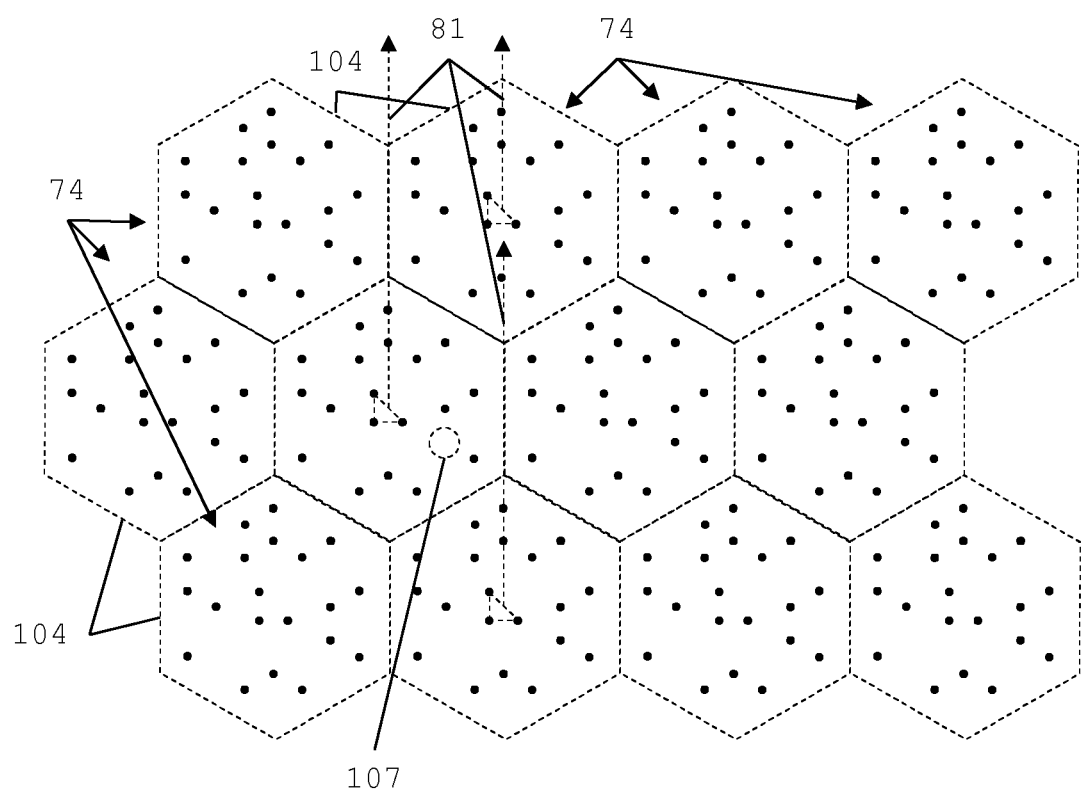
FIG. 8B shows the code of FIG. 8A duplicated and arranged in a tessellating manner.

In embodiments, each code 74 encodes the same information, as illustrated for example in FIG. 8B, allowing for example the code processing subsystem capturing an image of the code 74 even in cases where the support, for example the container of the invention, is not perfectly aligned with the image capturing device. The code processing subsystem is for example configured to reconstitute a code 74 from fragments of codes 74 visible in the captured image if no complete code 74 is present.

Repeating the code 74 with the same encoded information furthermore allows increasing the robustness of the overall system by allowing for example the correction of possible printing and/or reading error: the code processing subsystem may for example be configured to simultaneously or sequentially capture images of two or more codes 74, and compare the number and positions of data units 82 detected in each code 74 in order to detect possible errors, for example a misprint 107 in a particular code 74, and correspondingly correct the output of the code processing subsystem to provide the corrected output. Other error detection and/or correction schemes, in particular more complex and/or robust schemes, are furthermore possible within the frame of the invention thanks to the repetition of the same code in a tessellating manner, in particular in order to detect and/or correct errors due for example to a damaged or stretched support surface.

Arranging codes 74 in a tessellating manner also allows increasing the precision when determining the direction of the reference line 81 of a particular code 74, for example by first determining the direction of the reference line 81 on the basis of the reference configuration of the code itself, and then further correcting it on the basis of the location of the reference configuration of another code 74 aligned with a known offset relative to the first code 74.

Figure 8C:
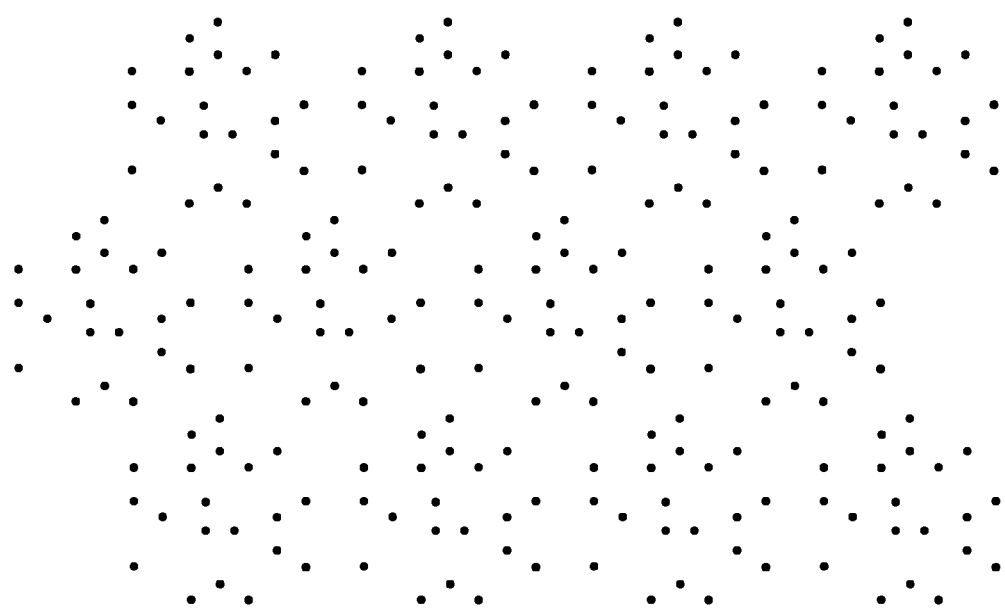
FIG. 8C shows the tessellating codes of FIG. 8B as they would typically appear when formed on a container or an attachment of the invention.

FIG. 8C is an exemplary illustration of codes of the invention, arranged in a tessellating manner, each code encoding the same information, as they would appear once formed on the surface for example of a container or of an attachment of the invention.

Figure 8D:
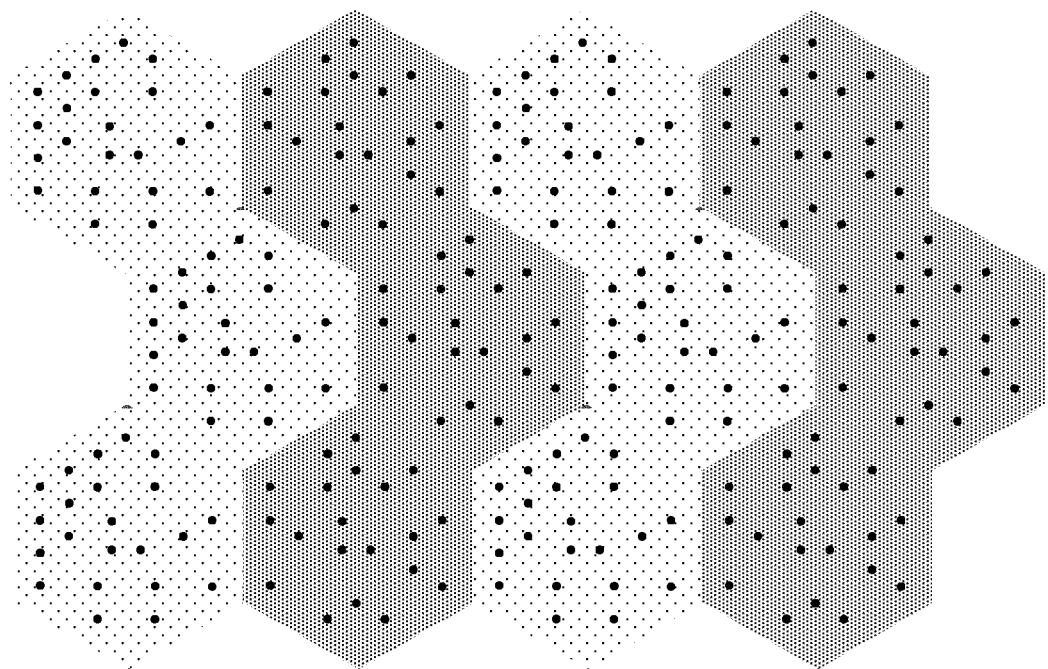
FIG. 8D illustrates the use of tessellating codes according to embodiments of the invention for encoding a plurality of sets of information.

In embodiments, codes 74 encoding different sets of information are arranged in a tessellating manner on a same support, for example on a container or an attachment of the invention, as illustrated for example in FIG. 8D. The different sets of information for example comprise preparation information related to different alternative recipes that may be used for preparing a beverage or foodstuff with the material contained in the container and/or preparation information relating to different, for example successive, phases of the preparation of the beverage or foodstuff, etc. In the illustrated example, the codes are arranged in rows alternating a code comprising a first set of information and a code comprising a second set of information, until for example a predetermined surface is covered. Other arrangements and/or numbers of different sets of information are however possible within the frame of the invention.

Machine and Container Attachments

Figure 9:
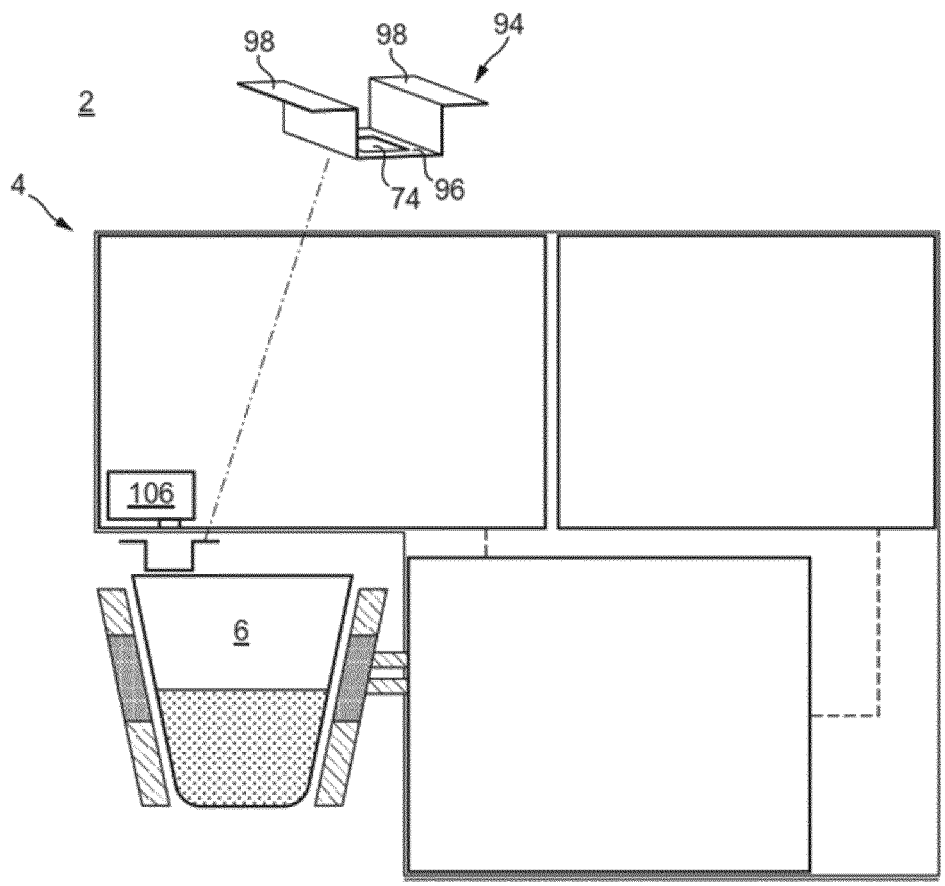
FIGS. 9 and 10 are diagrammatic drawings illustrating attachments for the system of FIG. 1 according to embodiments of the present disclosure.

An attachment 94 may comprise the afore-described code 74 arranged on a surface thereof, the attachment 94 configured for attachment to the afore-described beverage or foodstuff preparation machine 4. The attachment, an example which is illustrated in FIG. 9, comprises: a carrier 96 for carrying the code 74; an attachment member 98 for attachment of the carrier 96 to the machine 4 between an image capturing device 106 of said machine 4 and a container 6 received by said machine 4 and proximate said container. In this way an image of the code 74 can be captured by the image capturing device 106 as if it were attached to the container 6. Examples of suitable attachment members comprise: extensions attached to said carrier comprising an adhesive strip (as illustrated); a mechanical fastener such as a clip, bolt or bracket. The use of such an attachment 94 is particularly useful if: only one type of container 6 is used on the machine 4; a clean or other maintenance related operation is required.

Figure 10:
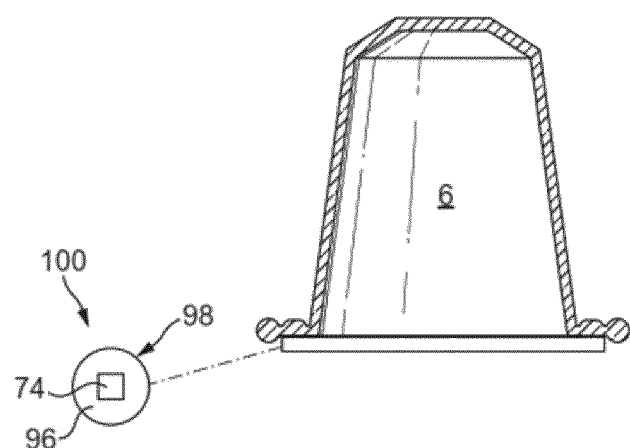

An alternate attachment 100 may comprise the afore-described code 74, arranged on a surface thereof, the attachment 100 configured for attachment to any of the afore-described containers 6. The attachment 100, an example which is illustrated in FIG. 10, comprises: a carrier 96 for carrying of the code 74; an attachment member 98 for attachment of the carrier 96 to the container 6. In this way an image of the code 74 can be captured by the image capturing device 106 as if it were formed integrally one the container 6. Examples of suitable attachment members comprise: an adhesive strip (as illustrated); a mechanical fastener such as a clip, bolt or bracket. The use of such an attachment 94 is particularly useful if: an end-user defined recipe is applied to the container 6; a clean or other maintenance related operation is required; it is more cost effective to form the code 74 on a substrate separate from the container 6 and attach said substrate to the container.

The invention claimed is:

1. Container for a beverage or foodstuff preparation machine, the container containing beverage or foodstuff material and comprising a code encoding preparation information, the code comprising a reference portion and a data portion;

the reference portion comprising three reference units defining a reference line, the three reference units being arranged at the vertices of an isosceles reference triangle having a reference apex angle; and the data portion comprising discrete positions at locations determined relative to said reference line, each of the discrete positions either comprises or does not comprise a data unit to at least partially encode the preparation information, wherein the discrete positions are arranged at vertices of a grid of isomorphic tessellating isosceles data triangles, the data triangles having a data apex angle different from the reference apex angle.

2. Container according to claim 1, wherein the data triangles are congruent.

3. Container according to claim 1, wherein the data apex angle ($\beta$) is neither a multiple nor a divisor of said reference apex angle.

4. Container according to claim 1, wherein the reference apex angle is 90°, the reference triangle being a right-angled isosceles triangle, and wherein the data apex angle is 60°, the data triangles being equilateral triangles.

5. Container according to claim 1, wherein the discrete positions are arranged around the three reference units.

6. Container according to claim 1, wherein the discrete positions are arranged on at least two concentric polygonal rows around three reference units.

7. Container according to claim 1, wherein the reference triangle, the data triangles and the reference line are virtual.

8. Container according to claim 1, wherein the code has a peripheral length of 600-1600 μm.

9. Container according to claim 1, wherein the code is formed on a surface of the container or on an attachment, which is attached thereto.

10. Container according to claim 1, wherein the container comprises a plurality of the codes arranged in a tessellating manner.

11. Beverage or foodstuff preparation system comprising a container containing beverage or foodstuff material and comprising a code encoding preparation information, the code comprising a reference portion and a data portion, the reference portion comprising three reference units defining a reference line, the three reference units being arranged at the vertices of an isosceles reference triangle having a reference apex angle, and the data portion comprising discrete positions at locations determined relative to said reference line, each of the discrete positions either comprises or does not comprise a data unit to at least partially encode the preparation information, wherein the discrete positions are arranged at vertices of a grid of isomorphic tessellating isosceles data triangles, the data triangles having a data apex angle different from the reference apex angle and a beverage or foodstuff preparation machine, the preparation machine comprising:
  a container processing subsystem to receive the container and to prepare a beverage or foodstuff therefrom;
  a code processing subsystem operable to: obtain a digital image of the code of the container, and process the digital image to decode the encoded preparation information;
  a control subsystem operable to control the container processing subsystem using the decoded preparation information; and
  wherein the code processing subsystem is configured to decode the encoded preparation information by: identifying the reference units of the code and determining therefrom a reference line; determining from the reference line the locations of the discrete positions; determining for each discrete position whether a data unit is arranged at the corresponding location or not; retrieving encoded preparation information from the result of the determining step.

12. Method of preparing a beverage or foodstuff using a system according to claim 11, the method comprising:
  placing the container in the container processing system;
  obtaining a digital image of the code of the container and processing the digital image to decode the encoded preparation information with the code processing subsystem;
  controlling the container processing subsystem with the control subsystem using a sequence of operations of said decoded preparation information;
  wherein the decoding of the encoded preparation information comprises:
  identifying the reference units of the code and determining therefrom a reference line;
  determining from the reference line the locations of the discrete positions;
  determining for each discrete position whether a data unit is arranged at the corresponding location or not; and
  retrieving encoded preparation information from the result of the determining step.

13. Attachment configured for attachment to a beverage or foodstuff preparation machine, the beverage or foodstuff preparation machine comprising:
  a container processing subsystem to receive a container containing beverage or foodstuff material and to prepare a beverage or foodstuff therefrom;
  a code processing subsystem operable to: obtain a digital image of a code; process the digital image to decode preparation information encoded in the code; and
  a control subsystem operable to control the container processing subsystem using the decoded preparation information;
  wherein the attachment comprises:
  an attachment member for attachment to the beverage or foodstuff preparation machine;
  a carrier carrying a code comprising a reference portion and a data portion,
  the reference portion comprising three reference units defining a reference line, the three reference units being arranged at the vertices of an isosceles reference triangle having a reference apex angle; and
  the data portion comprising discrete positions at locations determined relative to the reference line, each of the discrete positions either comprises or does not comprise a data unit to at least partially encode the preparation information, wherein the discrete positions are arranged at vertices of a grid of isomorphic tessellating isosceles data triangles, the data triangles having a data apex angle different from the reference apex angle.

14. Method of encoding preparation information, the method comprising forming a code on:
  a container for a beverage or foodstuff preparation machine, the container for containing beverage or foodstuff material; or
  an attachment for attachment to the container or a beverage or foodstuff preparation machine;
  the method further comprising:
  arranging three reference units at the vertices of an isosceles reference triangle having a reference apex angle, to define a reference line of a reference portion; and
  at least partially encoding a parameter of the preparation information by arranging data units on at least one of discrete positions whose locations are determined relative to said reference line, whereby the discrete positions are arranged at vertices of a grid of isomorphic tessellating isosceles data triangles, the data triangles having a data apex angle different from the reference apex angle.

* * * * *